United States Patent
Fukunaga et al.

(10) Patent No.: US 10,717,495 B2
(45) Date of Patent: Jul. 21, 2020

(54) BICYCLE SPROCKET

(71) Applicant: SHIMANO INC., Sakai (JP)

(72) Inventors: Yasufumi Fukunaga, Sakai (JP); Hiroshi Fujita, Sakai (JP); Tsuyoshi Fukumori, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 315 days.

(21) Appl. No.: 15/705,432

(22) Filed: Sep. 15, 2017

(65) Prior Publication Data

US 2019/0084647 A1 Mar. 21, 2019

(51) Int. Cl.
B62M 9/12 (2006.01)
F16H 55/30 (2006.01)

(52) U.S. Cl.
CPC .............. B62M 9/12 (2013.01); F16H 55/30 (2013.01)

(58) Field of Classification Search
CPC .......... B62M 9/10; B62M 9/105; B62M 9/12; F16H 55/30
USPC .......................................................... 474/160
See application file for complete search history.

(56) References Cited

U.S. PATENT DOCUMENTS

| | | | | |
|---|---|---|---|---|
| 5,971,878 A * | 10/1999 | Leng | ....................... | F16H 55/30 474/160 |
| 6,007,442 A * | 12/1999 | Schmidt | ................... | B62M 9/10 474/122 |
| 7,503,864 B2 * | 3/2009 | Nonoshita | .............. | B62M 9/105 474/160 |
| 8,550,944 B2 * | 10/2013 | Esquibel | .................. | B62M 9/10 474/160 |
| 9,915,336 B1 * | 3/2018 | Fukunaga | ................ | B62M 9/10 |
| 2005/0272546 A1 * | 12/2005 | Reiter | ...................... | B62M 9/10 474/152 |
| 2006/0116227 A1 * | 6/2006 | Mercat | ..................... | B62M 9/12 474/82 |
| 2014/0338494 A1 * | 11/2014 | Sugimoto | ................ | B62M 1/36 74/594.2 |
| 2015/0362057 A1 * | 12/2015 | Wesling | .................. | F16H 55/06 474/152 |
| 2016/0053882 A1 * | 2/2016 | Watarai | .................... | B62M 9/10 474/152 |
| 2016/0207590 A1 * | 7/2016 | Fukumori | .............. | F16H 55/30 |
| 2017/0029066 A1 * | 2/2017 | Fukunaga | ............. | F16H 55/303 |
| 2017/0101159 A1 * | 4/2017 | Watarai | .................. | B21K 23/00 |
| 2018/0178882 A1 * | 6/2018 | Vonend | .................... | B62M 9/10 |

* cited by examiner

Primary Examiner — Michael R Mansen
Assistant Examiner — Robert T Reese
(74) Attorney, Agent, or Firm — Mori & Ward, LLP

(57) ABSTRACT

A bicycle sprocket comprises a sprocket body, a plurality of sprocket teeth, an axially outward protuberance, and an axially inward protuberance. The axially outward protuberance is disposed on an outward facing side of the sprocket body to overlap at least partly with a bicycle chain engaging with a neighboring bicycle sprocket when viewed along a rotational center axis. The axially inward protuberance is disposed on an inward facing side of the sprocket body to overlap at least partly with the axially outward protuberance when viewed along the rotational center axis.

14 Claims, 31 Drawing Sheets

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket has a rotational center axis, an outward facing side facing in an axial direction parallel to the rotational center axis, and an inward facing side facing in the axial direction. The inward facing side is opposite to the outward facing side in the axial direction. The bicycle sprocket comprises a sprocket body, a plurality of sprocket teeth, an axially outward protuberance, and an axially inward protuberance. The sprocket body is rotatable about the rotational center axis. The plurality of sprocket teeth extends radially outward from the sprocket body with respect to the rotational center axis. The axially outward protuberance is disposed on the outward facing side of the sprocket body to overlap at least partly with a bicycle chain engaging with a neighboring bicycle sprocket when viewed along the rotational center axis. The neighboring bicycle sprocket is adjacent to the bicycle sprocket without another sprocket between the bicycle sprocket and the neighboring bicycle sprocket in the axial direction. The axially inward protuberance is disposed on the inward facing side of the sprocket body to overlap at least partly with the axially outward protuberance when viewed along the rotational center axis.

With the bicycle sprocket according to the first aspect, the axially outward protuberance improves chain-holding performance of the bicycle sprocket. Furthermore, at least one of the axially outward protuberance and the axially inward protuberance maintains strength of the bicycle sprocket.

In accordance with a second aspect of the present invention, a bicycle sprocket having a rotational center axis, an outward facing side facing in an axial direction parallel to the rotational center axis, and an inward facing side facing in the axial direction. The inward facing side is opposite to the outward facing side in the axial direction. The bicycle sprocket comprises a sprocket body, a plurality of sprocket teeth, an axially outward protuberance, and an axially inward protuberance. The sprocket body is rotatable about the rotational center axis. The plurality of sprocket teeth extends radially outward from the sprocket body with respect to the rotational center axis. The axially outward protuberance is disposed on the outward facing side of the sprocket body. The axially outward protuberance protrudes from the sprocket body beyond the plurality of sprocket teeth in the axial direction. The axially outward protuberance is provided radially between a root circle of the bicycle sprocket and a neighboring smaller root circle of a neighboring smaller bicycle sprocket when viewed along the rotational center axis. The neighboring smaller bicycle sprocket is adjacent to the outward facing side of the bicycle sprocket without another sprocket between the bicycle sprocket and the neighboring bicycle sprocket in the axial direction. The axially inward protuberance is disposed on the inward facing side of the sprocket body to overlap at least partly with the axially outward protuberance when viewed along the rotational center axis.

With the bicycle sprocket according to the second aspect, the axially outward protuberance improves chain-holding performance of the bicycle sprocket. Furthermore, at least one of the axially outward protuberance and the axially inward protuberance maintains strength of the bicycle sprocket.

In accordance with a third aspect of the present invention, a bicycle sprocket having a rotational center axis, an outward facing side facing in an axial direction parallel to the rotational center axis, and an inward facing side facing in the axial direction. The inward facing side is opposite to the outward facing side in the axial direction. The bicycle sprocket comprises a sprocket body, a plurality of sprocket teeth, an axially outward protuberance, and an axially inward protuberance. The sprocket body is rotatable about the rotational center axis. The plurality of sprocket teeth extends radially outward from the sprocket body with respect to the rotational center axis. The axially outward protuberance is disposed on the outward facing side of the sprocket body. The axially outward protuberance protrudes from the sprocket body beyond the plurality of sprocket teeth in the axial direction. The axially outward protuberance is provided radially inwardly of a root circle of the bicycle sprocket. The axially outward protuberance is at least partly provided radially outwardly of a reference circle which is defined radially inwardly from the root circle of the bicycle sprocket by 10 mm. The axially inward protuberance is disposed on the inward facing side of the sprocket body to overlap at least partly with the axially outward protuberance when viewed along the rotational center axis.

With the bicycle sprocket according to the third aspect, the axially outward protuberance improves chain-holding performance of the bicycle sprocket. Furthermore, at least one of the axially outward protuberance and the axially inward protuberance maintains strength of the bicycle sprocket.

In accordance with a fourth aspect of the present invention, the bicycle sprocket according to any one of the first to third aspects is configured so that the axially outward protuberance has a first axial length defined from the sprocket body in the axial direction. The axially inward protuberance has a second axial length defined from the sprocket body in the axial direction. The first axial length is different from the second axial length.

With the bicycle sprocket according to the fourth aspect, it is possible to adjust at least one of the first axial length and the second axial length in accordance with a clearance provided between the bicycle sprocket and the neighboring bicycle sprocket and/or favorable strength of the bicycle sprocket.

In accordance with a fifth aspect of the present invention, the bicycle sprocket according to the fourth aspect is configured so that the first axial length is smaller than the second axial length.

With the bicycle sprocket according to the fifth aspect, it is possible to improve chain-holding performance of the bicycle sprocket even if the clearance is small.

In accordance with a sixth aspect of the present invention, the bicycle sprocket according to the fourth or fifth aspect is configured so that the first axial length is larger than 0.1 mm and smaller than 0.5 mm.

With the bicycle sprocket according to the sixth aspect, it is possible to effectively improve chain-holding performance of the bicycle sprocket.

In accordance with a seventh aspect of the present invention, the bicycle sprocket according to any one of the fourth to sixth aspects is configured so that the second axial length is larger than 0.3 mm and smaller than 1 mm.

With the bicycle sprocket according to the seventh aspect, it is possible to effectively maintain strength of the bicycle sprocket.

In accordance with an eighth aspect of the present invention, the bicycle sprocket according to any one of the first to seventh aspects is configured so that at least one of the axially outward protuberance and the axially inward protuberance is provided radially inwardly of a root circle of the bicycle sprocket.

With the bicycle sprocket according to the eighth aspect, it is possible to effectively maintain strength of the bicycle sprocket.

In accordance with a ninth aspect of the present invention, the bicycle sprocket according to any one of the first to eighth aspects is configured so that the axially outward protuberance includes a recess to reduce interference between the bicycle chain and the axially outward protuberance in a shifting operation in which the bicycle chain is shifted from a neighboring bicycle sprocket to an additional neighboring bicycle sprocket, the neighboring bicycle sprocket being adjacent to the bicycle sprocket without another sprocket between the bicycle sprocket and the neighboring bicycle sprocket in the axial direction, the additional neighboring bicycle sprocket being adjacent to the neighboring bicycle sprocket without another sprocket between the neighboring bicycle sprocket and the additional neighboring bicycle sprocket in the axial direction.

With the bicycle sprocket according to the ninth aspect, the recess makes the shifting operation smooth.

In accordance with a tenth aspect of the present invention, the bicycle sprocket according to the ninth aspect is configured so that the axially outward protuberance has a first axial length defined from the sprocket body in the axial direction. The recess has an axial depth defined in the axial direction. The axial depth is equal to or larger than the first axial length.

With the bicycle sprocket according to the tenth aspect, the recess makes the shifting operation smoother.

In accordance with an eleventh aspect of the present invention, the bicycle sprocket according to any one of the first to tenth aspects further comprises an axially inward recess provided on the outward facing side to facilitate an inward shifting operation in which the bicycle chain is shifted from a smaller sprocket to the bicycle sprocket.

With the bicycle sprocket according to the eleventh aspect, the axially inward recess makes the inward shifting operation smooth.

In accordance with a twelfth aspect of the present invention, the bicycle sprocket according to any one of the first to eleventh aspects further comprises an axially outward recess provided on the outward facing side to facilitate an outward shifting operation in which the bicycle chain is shifted from the bicycle sprocket to a smaller sprocket.

With the bicycle sprocket according to the twelfth aspect, the axially outward recess makes the outward shifting operation smooth.

In accordance with a thirteenth aspect of the present invention, the bicycle sprocket according to any one of the first to twelfth aspects is configured so that the bicycle sprocket is made of aluminum.

With the bicycle sprocket according to the thirteenth aspect, it is possible to save a weight of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
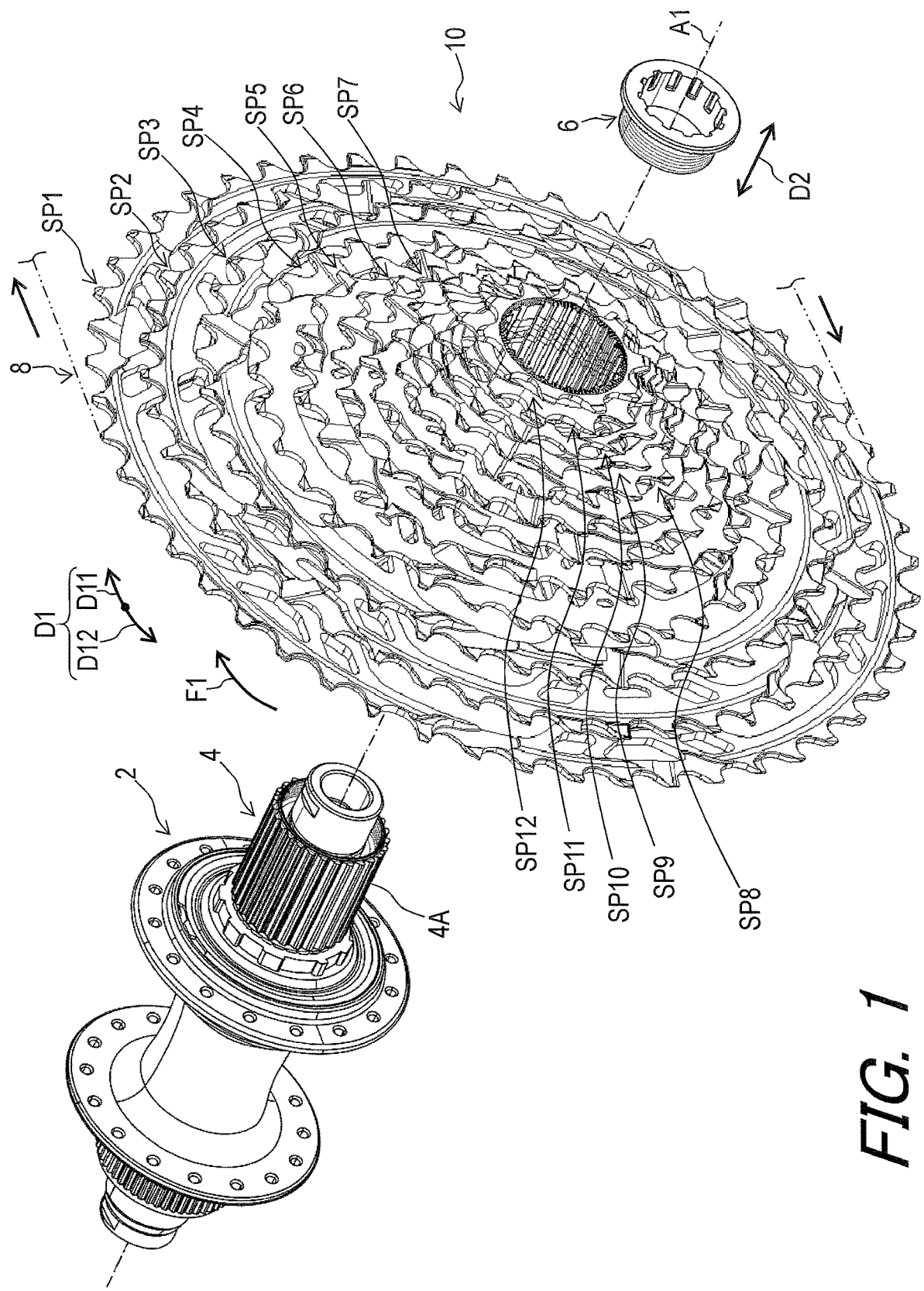
FIG. 1 is a perspective view of a bicycle rear sprocket assembly including a bicycle sprocket in accordance with an embodiment, with a bicycle hub assembly and a lock ring.

The embodiment(s) will now be described with reference to the accompanying drawings, wherein like reference numerals designate corresponding or identical elements throughout the various drawings.

Referring initially to FIG. 1, a bicycle rear sprocket assembly 10 in accordance with an embodiment comprises a plurality of bicycle sprockets SP1 to SP12. However, a total number of sprockets of the bicycle rear sprocket assembly 10 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10, should be interpreted relative to the bicycle equipped with the bicycle rear sprocket assembly 10 as used in an upright riding position on a horizontal surface.

As seen in FIG. 1, the bicycle rear sprocket assembly 10 has a rotational center axis A1. The bicycle rear sprocket assembly 10 is rotatably supported by a bicycle hub assembly 2 relative to a bicycle frame (not shown) about the rotational center axis A1. The bicycle rear sprocket assembly 10 is secured to a sprocket support body 4 of the bicycle hub assembly 2 with a lock ring 6. The bicycle rear sprocket assembly 10 is configured to be engaged with a bicycle chain 8 to transmit a driving rotational force F1 between the bicycle chain 8 and the bicycle rear sprocket assembly 10 during pedaling. The bicycle rear sprocket assembly 10 is rotated about the rotational center axis A1 in a driving rotational direction D11 during pedaling. The driving rotational direction D11 is defined along a circumferential direction D1 of the bicycle hub assembly 2 or the bicycle rear sprocket assembly 10. A reverse rotational direction D12 is an opposite direction of the driving rotational direction D11 and is defined along the circumferential direction D1.

Figure 2:
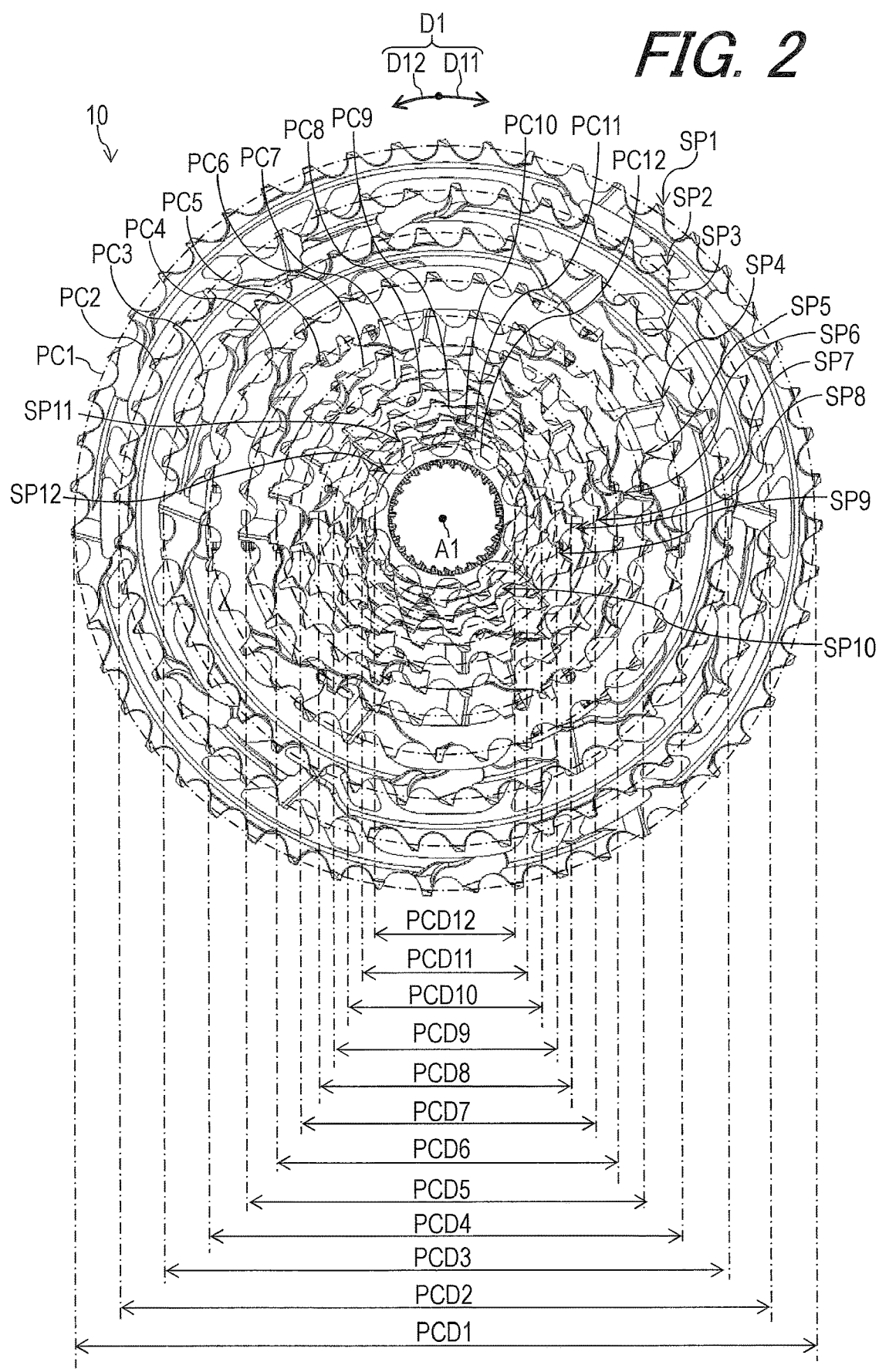
FIG. 2 is a side elevational view of the bicycle rear sprocket assembly illustrated in FIG. 1.

As seen in FIG. 2, the bicycle sprocket SP1 has a first pitch-circle diameter PCD1. The bicycle sprocket SP2 has a second pitch-circle diameter PCD2. The bicycle sprocket SP3 has a third pitch-circle diameter PCD3. The bicycle sprocket SP4 has a fourth pitch-circle diameter PCD4. The bicycle sprocket SP5 has a fifth pitch-circle diameter PCD5. The bicycle sprocket SP6 has a sixth pitch-circle diameter PCD6. The bicycle sprocket SP7 has a seventh pitch-circle diameter PCD7. The bicycle sprocket SP8 has an eighth pitch-circle diameter PCD5. The bicycle sprocket SP9 has a ninth pitch-circle diameter PCD9. The bicycle sprocket SP10 has a tenth pitch-circle diameter PCD10. The bicycle sprocket SP11 has an eleventh pitch-circle diameter PCD11. The bicycle sprocket SP12 has a twelfth pitch-circle diameter PCD12.

The bicycle sprocket SP1 has a first pitch circle PC1 having the first pitch-circle diameter PCD1. The bicycle sprocket SP2 has a second pitch circle PC2 having the second pitch-circle diameter PCD2. The bicycle sprocket SP3 has a third pitch circle PC3 having the third pitch-circle diameter PCD3. The bicycle sprocket SP4 has a fourth pitch circle PC4 having the fourth pitch-circle diameter PCD4. The bicycle sprocket SP5 has a fifth pitch circle PC5 having the fifth pitch-circle diameter PCD5. The bicycle sprocket SP6 has a sixth pitch circle PC6 having the sixth pitch-circle diameter PCD6. The bicycle sprocket SP7 has a seventh pitch circle PC7 having the seventh pitch-circle diameter PCD7. The bicycle sprocket SP8 has an eighth pitch circle PC8 having the eighth pitch-circle diameter PCD8. The bicycle sprocket SP9 has a ninth pitch circle PC9 having the ninth pitch-circle diameter PCD9. The bicycle sprocket SP10 has a tenth pitch circle PC10 having the tenth pitch-circle diameter PCD10. The bicycle sprocket SP11 has an eleventh pitch circle PC11 having the eleventh pitch-circle diameter PCD11. The bicycle sprocket SP12 has a twelfth pitch circle PC12 having the twelfth pitch-circle diameter PCD12.

The first pitch circle PC1 is defined by center axes of pins of the bicycle chain 8 (FIG. 1) engage with the bicycle sprocket SP1. The second to twelfth pitch circles PC2 to PC12 are defined as well as the first pitch circle PC1. Thus, they will not be descried in detail here for the sake of brevity.

In this embodiment, the first pitch-circle diameter PCD1 is larger than the second pitch-circle diameter PCD2. The second pitch-circle diameter PCD2 is larger than the third pitch-circle diameter PCD3. The third pitch-circle diameter PCD3 is larger than the fourth pitch-circle diameter PCD4. The first pitch-circle diameter PCD1 is the largest pitch-circle diameter in the bicycle rear sprocket assembly 10. The twelfth pitch-circle diameter PCD12 is the smallest pitch-circle diameter in the bicycle rear sprocket assembly 10. The bicycle sprocket SP1 corresponds to low gear in the bicycle rear sprocket assembly 10. The bicycle sprocket SP12 corresponds to top gear in the bicycle rear sprocket assembly 10. However, the bicycle sprocket SP1 can correspond to another gear in the bicycle rear sprocket assembly 10.

Figure 3:
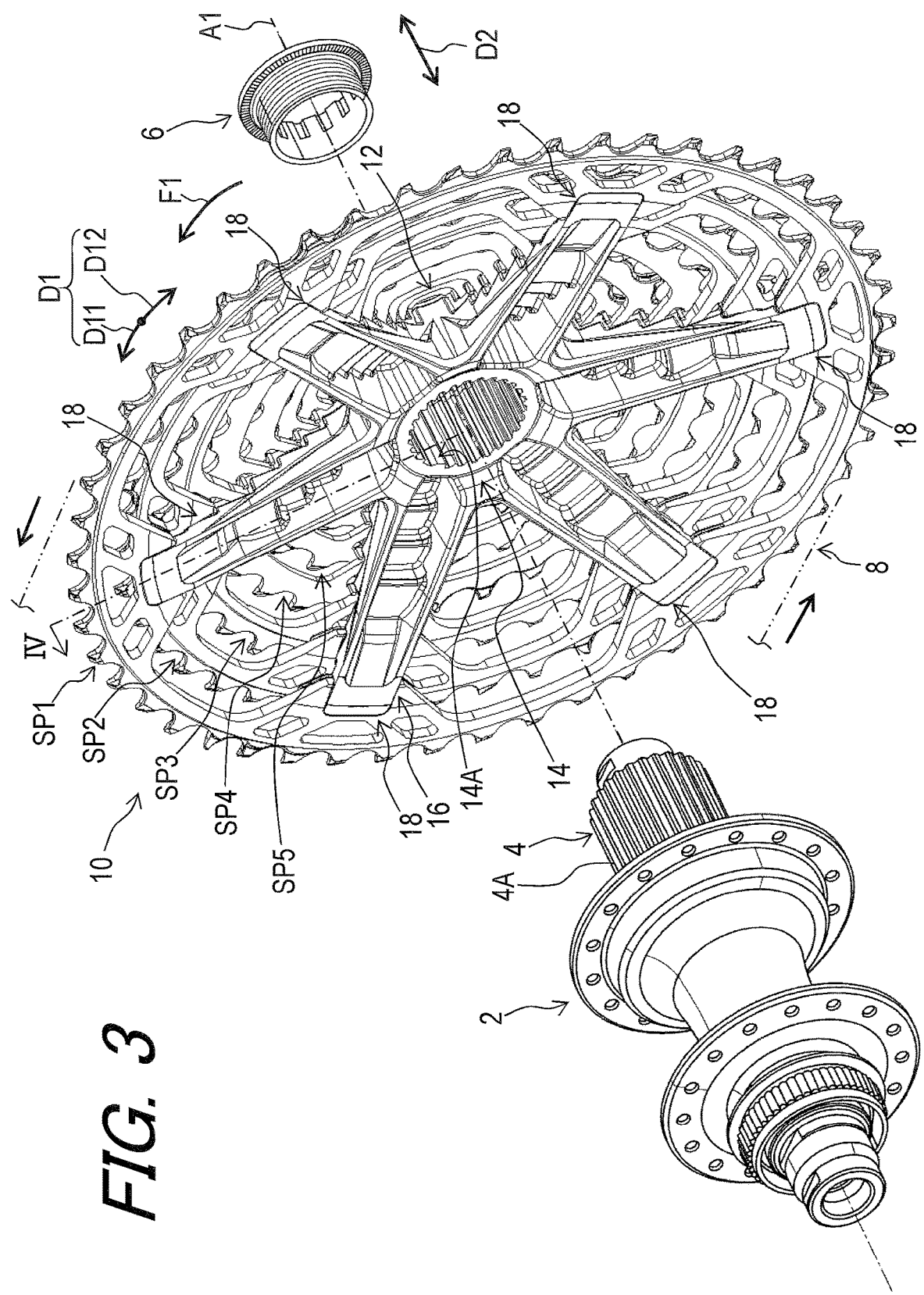
FIG. 3 is another perspective view of the bicycle rear sprocket assembly illustrated in FIG. 1, with the bicycle hub assembly and the lock ring.

As seen in FIG. 3, the bicycle rear sprocket assembly 10 comprises a sprocket support 12. The sprocket support 12 is configured to engage with the bicycle hub assembly 2. The sprocket support 12 includes a hub engagement part 14 configured to engage with the bicycle hub assembly 2. The hub engagement part 14 includes an internal spline 14A. The sprocket support body 4 of the bicycle hub assembly 2 includes an external spline 4A. The internal spline 14A of the hub engagement part 14 is engageable with the external spline 4A of the sprocket support body 4 to transmit the driving rotational force F1 between the bicycle rear sprocket assembly 10 and the bicycle hub assembly 2. The sprocket support 12 includes a sprocket attachment part 16. The sprocket attachment part 16 includes a plurality of support arms 18 extending radially outwardly from the hub engagement part 14. In this embodiment, the sprocket attachment part 16 includes six support arms 18. However, a total number of the support arms 18 is not limited to this embodiment.

Figure 4:
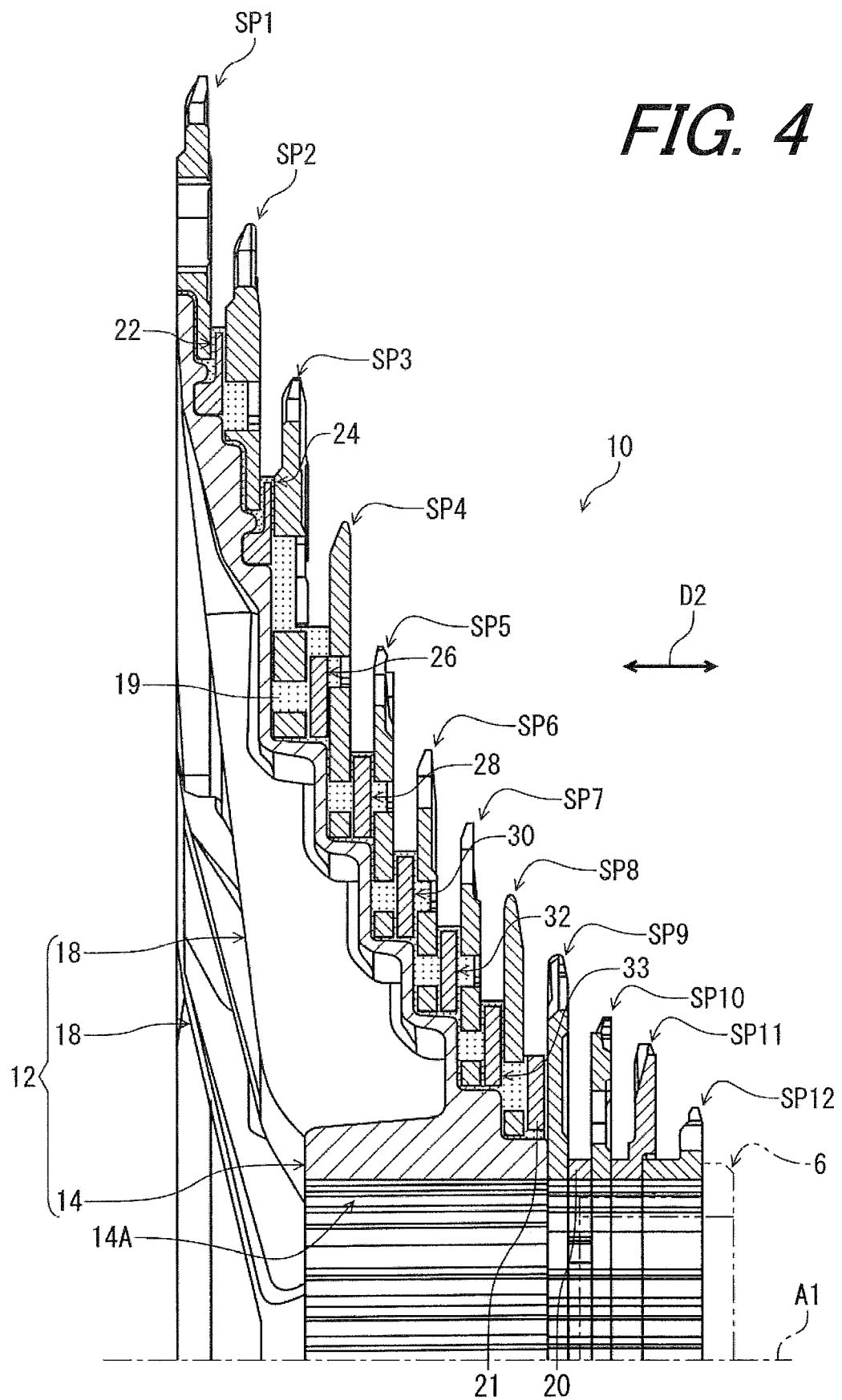
FIG. 4 is a cross-sectional view of the bicycle rear sprocket assembly taken along line IV-IV of FIG. 3.

As seen in FIG. 4, the bicycle sprockets SP1 to SP12 are arranged in this order in an axial direction D2 parallel to the rotational center axis A1. The bicycle sprocket SP1 is adjacent to the bicycle sprocket SP2 without another sprocket between the bicycle sprocket SP1 and the bicycle sprocket SP2 in the axial direction D2 with respect to the rotational center axis A1. The bicycle sprocket SP2 is adjacent to the bicycle sprocket SP3 without another sprocket between the bicycle sprocket SP2 and the bicycle sprocket SP3 in the axial direction D2 with respect to the rotational center axis A1. The bicycle sprocket SP3 is adjacent to the bicycle sprocket SP4 without another sprocket between the bicycle sprocket SP3 and the bicycle sprocket SP4 in the axial direction D2 with respect to the rotational center axis A1. The bicycle sprockets SP5 to SP12 are arranged in the axial direction D2 in this order.

The bicycle sprocket SP1 and the bicycle sprocket SP2 are attached to the sprocket attachment part 16. The bicycle sprocket SP3 and the bicycle sprocket SP4 are attached to the sprocket attachment part 16. The bicycle sprocket SP1 and the bicycle sprocket SP2 are attached to the plurality of support arms 18. At least one of the bicycle sprockets SP5 to SP12 are attached to at least one of the hub engagement part 14 and the sprocket attachment part 16. In this embodiment, the bicycle sprockets SP3 to SP8 are attached to the plurality of support arms 18. The bicycle sprockets SP8 and SP9 are attached to the hub engagement part 14.

Figure 5:
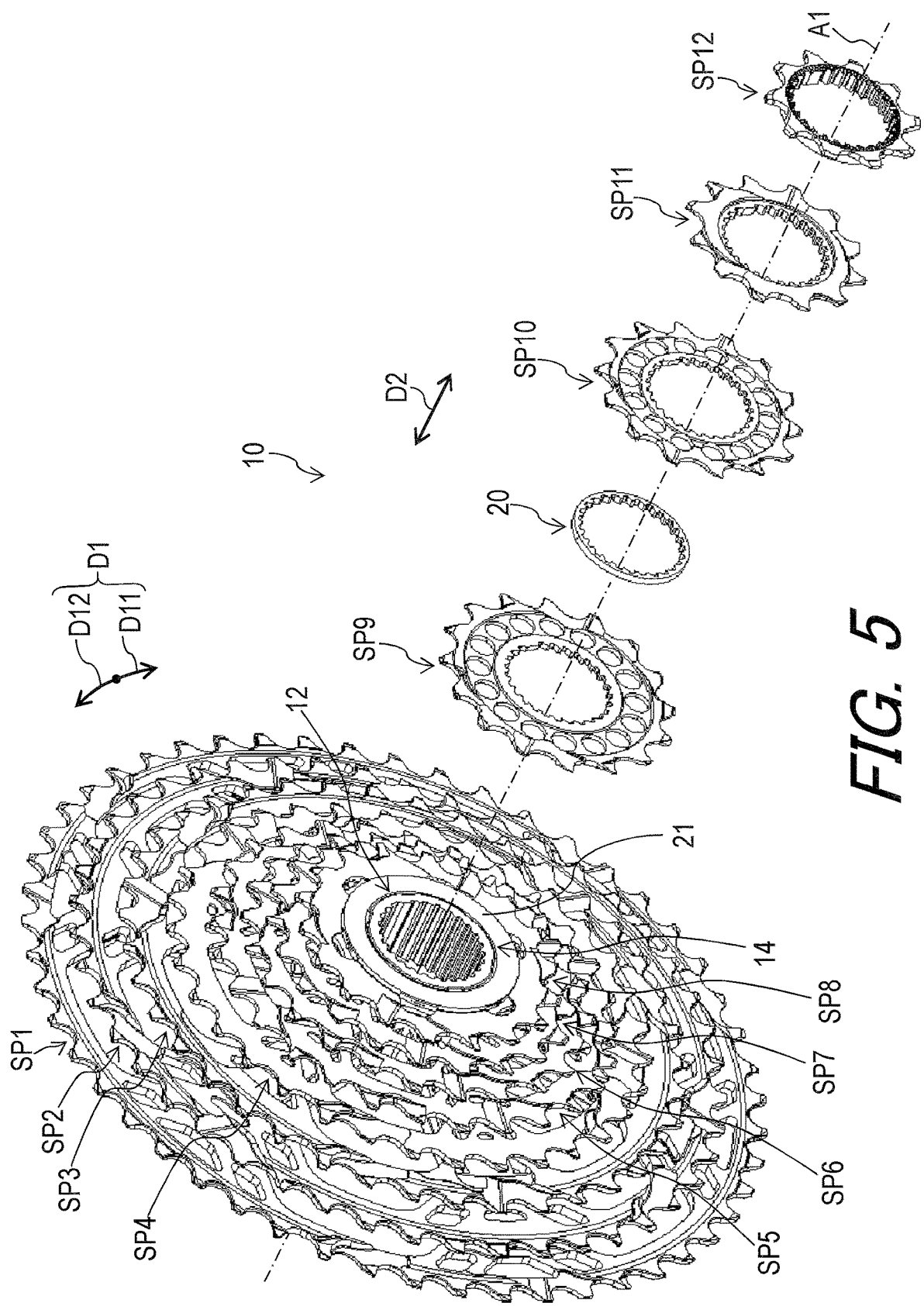
FIG. 5 is an exploded perspective view of the bicycle rear sprocket assembly illustrated in FIG. 1.

As seen in FIG. 5, the bicycle rear sprocket assembly 10 comprises an intermediate ring 20 and a ring cover 21. The intermediate ring 20 is provided between the bicycle sprocket SP9 and the bicycle sprocket SP10 in the axial direction D2. The ring cover 21 is provided between the bicycle sprocket SP8 and the bicycle sprocket SP9 in the axial direction D2. The bicycle sprockets SP1 to SP8 and the ring cover 21 are mounted on the sprocket support 12. The bicycle sprockets SP9 to SP12 and the intermediate ring 20 are not mounted on the sprocket support 12.

As seen in FIG. 4, the bicycle sprockets SP9 to SP12 and the intermediate ring 20 are held between the sprocket support 12 and the lock ring 6 in a state where the bicycle rear sprocket assembly 10 is mounted on the bicycle hub assembly 2 (FIG. 1). The bicycle sprockets SP9 to SP12 and the intermediate ring 20 are not attached to each other. However, at least one of the bicycle sprockets SP9 to SP12 and the intermediate ring 20 can be attached to an adjacent member.

The bicycle sprockets SP1 to SP8 are attached to the sprocket support 12 in this embodiment. The ring cover 21 is attached to at least one of the sprocket support 12 and the bicycle sprocket SP8. For example, the bicycle sprockets SP1 to SP8 are attached to the sprocket support 12 with a bonding structure such as adhesive without a metallic fastener. For example, the bicycle rear sprocket assembly 10 comprises an adhesive 19. This structure saves weight of the bicycle rear sprocket assembly 10. However, at least one of the bicycle sprockets SP1 to SP12 can be attached to the sprocket support 12 with a metallic fastener.

In this embodiment, the bicycle sprockets SP1 to SP12, the intermediate ring 20, and the ring cover 21 are separate members from each other. However, at least one of the bicycle sprockets SP1 to SP12, the intermediate ring 20, and the ring cover 21 can be integrally provided with another of the bicycle sprockets SP1 to SP12, the intermediate ring 20, and the ring cover 21 as a one-piece unitary member.

Each of the bicycle sprockets SP1 to SP12 is made of a metallic material. For example, the bicycle sprocket SP1 is made of aluminum. The bicycle sprocket SP2 is made of aluminum. The bicycle sprocket SP3 is made of aluminum. Each of the bicycle sprockets SP4 to SP12 is made of aluminum. However, at least one of the bicycle sprockets SP1 to SP12 can be made of another material such as iron, titanium, and stainless steel. The sprocket support 12 is made of a material including a non-metallic material such as a resin material, fiber-reinforced-plastic and carbon-fiber-reinforced-plastic. However, the material of the sprocket support 12 can include a metallic material such as iron, aluminum, titanium, and stainless steel.

Figure 6:
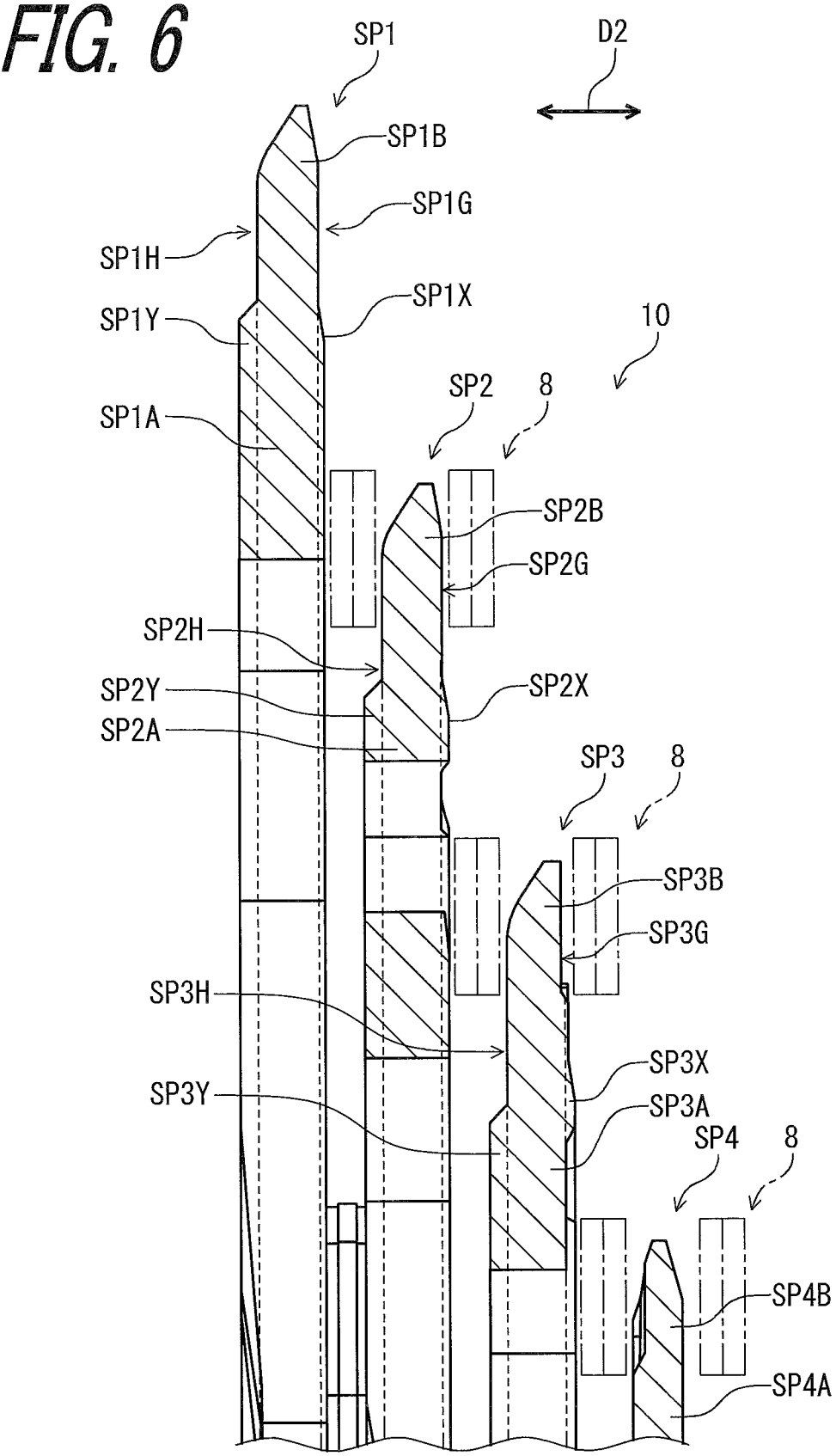
FIG. 6 is a cross-sectional view of the bicycle rear sprocket assembly taken along line VI-VI of FIGS. 24, 28, and 30.

As seen in FIG. 6, the bicycle sprocket SP1 has an outward facing side SP and an inward facing side SP1H. The outward facing side SP1G faces in the axial direction D2 parallel to the rotational center axis A1. The inward facing side SP1H faces in the axial direction D2. The inward facing side SP1H is opposite to the outward facing side SP1G in the axial direction D2. The outward facing side SP1G faces toward the bicycle sprocket SP2 in the axial direction D2.

The bicycle sprocket SP2 has an outward facing side SP2G and an inward facing side SP2H. The outward facing side SP2G faces in the axial direction D2 parallel to the rotational center axis A1. The inward facing side SP2H faces in the axial direction D2. The inward facing side SP2H is opposite to the outward facing side SP2G in the axial direction D2. The inward facing side SP2H faces toward the bicycle sprocket SP1 in the axial direction D2. The outward facing side SP2G faces toward the bicycle sprocket SP3 in the axial direction D2.

The bicycle sprocket SP3 has an outward facing side SP3G and an inward facing side SP3H. The outward facing side SP3G faces in the axial direction D2 parallel to the rotational center axis A1. The inward facing side SP3H faces in the axial direction D2. The inward facing side SP3H is opposite to the outward facing side SP3G in the axial direction D2. The inward facing side SP3H faces toward the bicycle sprocket SP2 in the axial direction D2. The outward facing side SP3G faces toward the bicycle sprocket SP4 in the axial direction D2.

Figure 7:
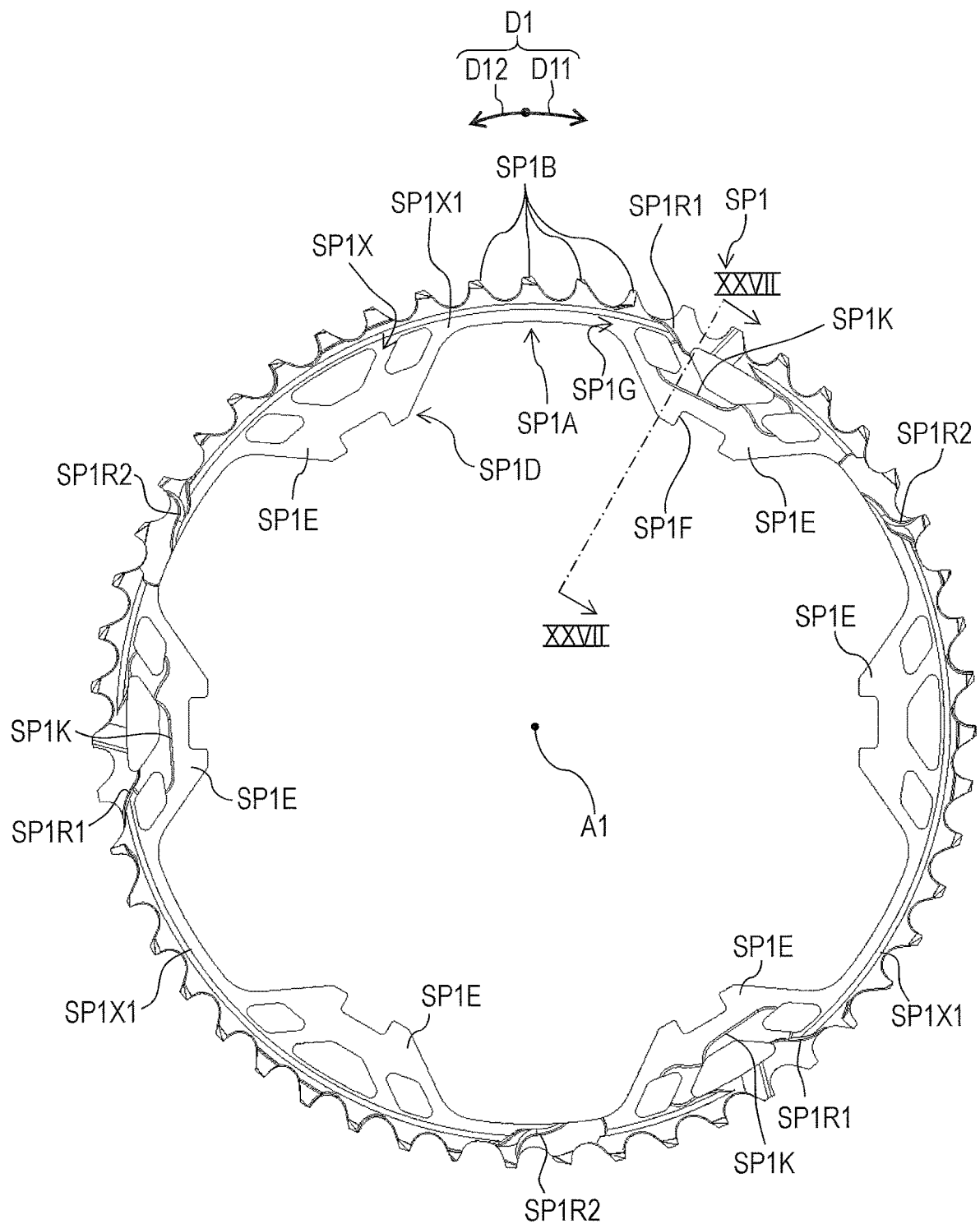
FIG. 7 is a side elevational view of a bicycle sprocket of the bicycle rear sprocket assembly illustrated in FIG. 1.

As seen in FIG. 7, the bicycle sprocket SP1 has the rotational center axis A1. The bicycle sprocket SP1 comprises a sprocket body SP1A and a plurality of sprocket teeth SP1B. The sprocket body SP1A is rotatable about the rotational center axis A1. The plurality of sprocket teeth SP1B extends radially outward from the sprocket body SP1A with respect to the rotational center axis A1.

The sprocket body SP1A includes a support attachment part SP1D attached to the sprocket support 12. The support attachment part SP1D includes a plurality of attachment portions SP1E attached to the plurality of support arms 18. A total number of the first attachment portions SP1E is equal to the total number of the support arms 18. However, the total number of the attachment portions SP1E is not limited to this embodiment. At least one of the attachment portions SP1E can be omitted from the bicycle sprocket SP1.

The bicycle sprocket SP1 further comprises an axially inward recess SP1R1 provided on the outward facing side SP to facilitate an inward shifting operation in which the bicycle chain 8 is shifted from the smaller sprocket SP2 to the bicycle sprocket SP1. The sprocket body SP1A includes an axially outward recess SP1R2 provided on the outward facing side SP1G to facilitate an outward shifting operation in which the bicycle chain 8 is shifted from the bicycle sprocket SP1 to the smaller sprocket SP2.

In this embodiment, the bicycle sprocket SP1 comprises a plurality of axially inward recesses SP1R1 provided on the outward facing side SP1G to facilitate the inward shifting operation. The bicycle sprocket SP1 comprises a plurality of axially outward recesses SP1R2 provided on the outward facing side SP to facilitate the outward shifting operation. However, a total number of the axially inward recesses SP1R1 is not limited to this embodiment. A total number of the axially outward recesses SP1R2 is not limited to this embodiment.

Figure 8:
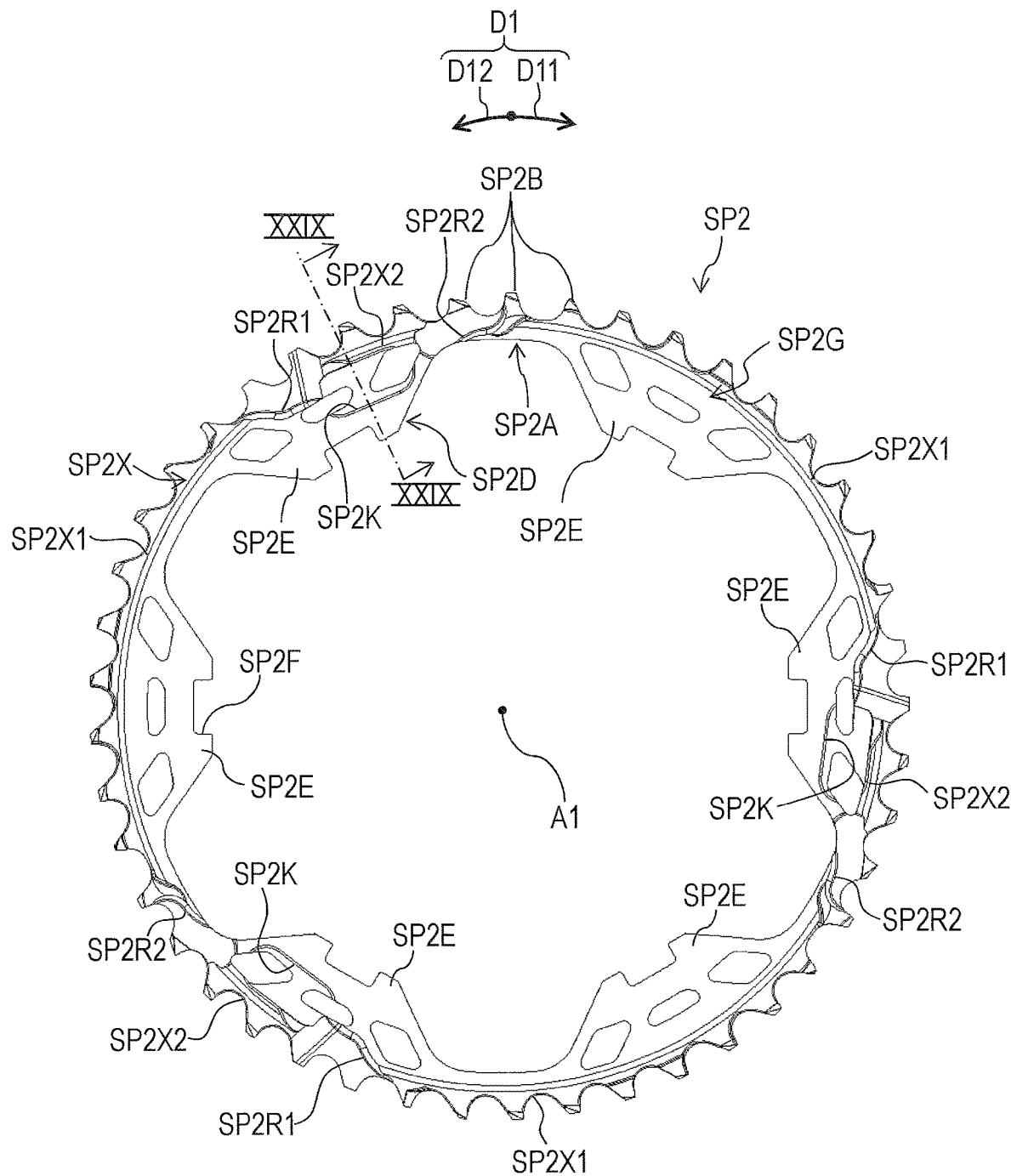
FIG. 8 is a side elevational view of a bicycle sprocket of the bicycle rear sprocket assembly illustrated in FIG. 1.

As seen in FIG. 8, the bicycle sprocket SP2 has the rotational center axis A1. The bicycle sprocket SP2 comprises a sprocket body SP2A and a plurality of sprocket teeth SP2B. The sprocket body SP2A is rotatable about the rotational center axis A1. The plurality of sprocket teeth SP2B extends radially outward from the sprocket body SP2A with respect to the rotational center axis A1.

The sprocket body SP2A includes a support attachment part SP2D attached to the sprocket support 12. The support attachment part SP2D includes a plurality of attachment portions SP2E attached to the plurality of support arms 18. A total number of the first attachment portions SP2E is equal to the total number of the support arms 18. However, the total number of the attachment portions SP2E is not limited to this embodiment. At least one of the attachment portions SP2E can be omitted from the bicycle sprocket SP2.

The bicycle sprocket SP2 further comprises an axially inward recess SP2R1 provided on the outward facing side SP2G to facilitate an inward shifting operation in which the bicycle chain 8 is shifted from the smaller sprocket SP3 to the bicycle sprocket SP2. The bicycle sprocket SP2 further comprises an axially outward recess SP2R2 provided on the outward facing side SP2G to facilitate an outward shifting operation in which the bicycle chain 8 is shifted from the bicycle sprocket SP2 to the smaller sprocket SP3.

In this embodiment, the bicycle sprocket SP2 comprises a plurality of axially inward recesses SP2R1 provided on the outward facing side SP2G to facilitate the inward shifting operation. The bicycle sprocket SP2 comprises a plurality of axially outward recesses SP2R2 provided on the outward facing side SP2G to facilitate the outward shifting operation. However, a total number of the axially inward recesses SP2R1 is not limited to this embodiment. A total number of the axially outward recesses SP2R2 is not limited to this embodiment.

Figure 9:
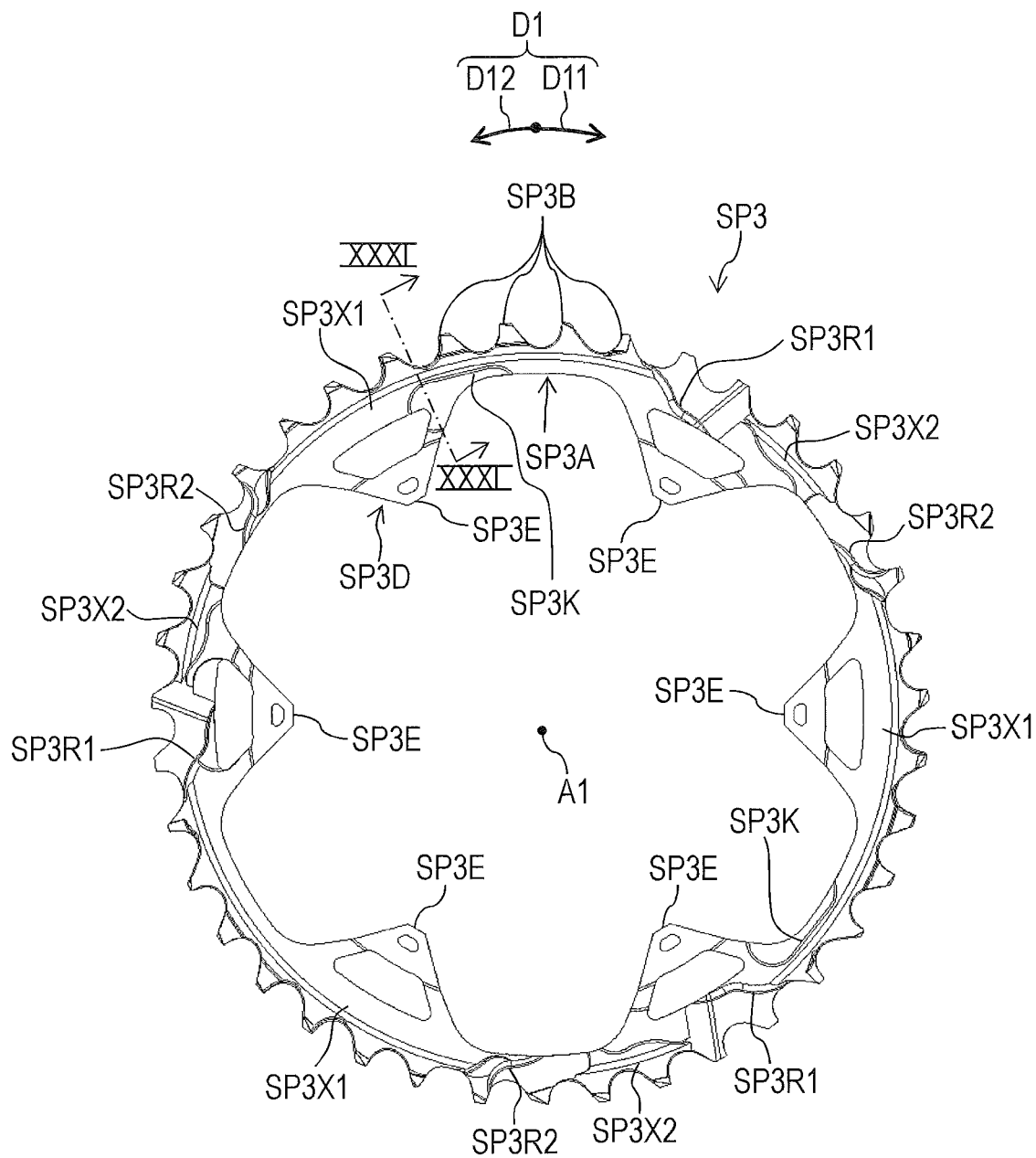
FIG. 9 is a side elevational view of a bicycle sprocket of the bicycle rear sprocket assembly illustrated in FIG. 1.

As seen in FIG. 9, the bicycle sprocket SP3 has the rotational center axis A1. The bicycle sprocket SP3 comprises a sprocket body SP3A and a plurality of sprocket teeth SP3B. The sprocket body SP3A is rotatable about the rotational center axis A1. The plurality of sprocket teeth SP3B extends radially outward from the sprocket body SP3A with respect to the rotational center axis A1.

The sprocket body SP3A includes a support attachment part SP3D attached to the sprocket support 12. The support attachment part SP3D includes a plurality of attachment portions SP3E attached to the plurality of support arms 18. A total number of the first attachment portions SP3E is equal to the total number of the support arms 18. However, the total number of the attachment portions SP3E is not limited to this embodiment. At least one of the attachment portions SP3E can be omitted from the bicycle sprocket SP3.

The bicycle sprocket SP3 further comprises an axially inward recess SP3R1 provided on the outward facing side SP3G to facilitate an inward shifting operation in which the bicycle chain 8 is shifted from the smaller sprocket SP4 to the bicycle sprocket SP3. The bicycle sprocket SP3 further comprises an axially outward recess SP3R2 provided on the outward facing side SP3G to facilitate an outward shifting operation in which the bicycle chain 8 is shifted from the bicycle sprocket SP3 to the smaller sprocket SP4.

In this embodiment, the bicycle sprocket SP3 comprises a plurality of axially inward recesses SP3R1 provided on the outward facing side SP3G to facilitate the inward shifting operation. The bicycle sprocket SP3 comprises a plurality of axially outward recesses SP3R2 provided on the outward facing side SP3G to facilitate the outward shifting operation. However, a total number of the axially inward recesses SP3R1 is not limited to this embodiment. A total number of the axially outward recesses SP3R2 is not limited to this embodiment.

Figure 10:
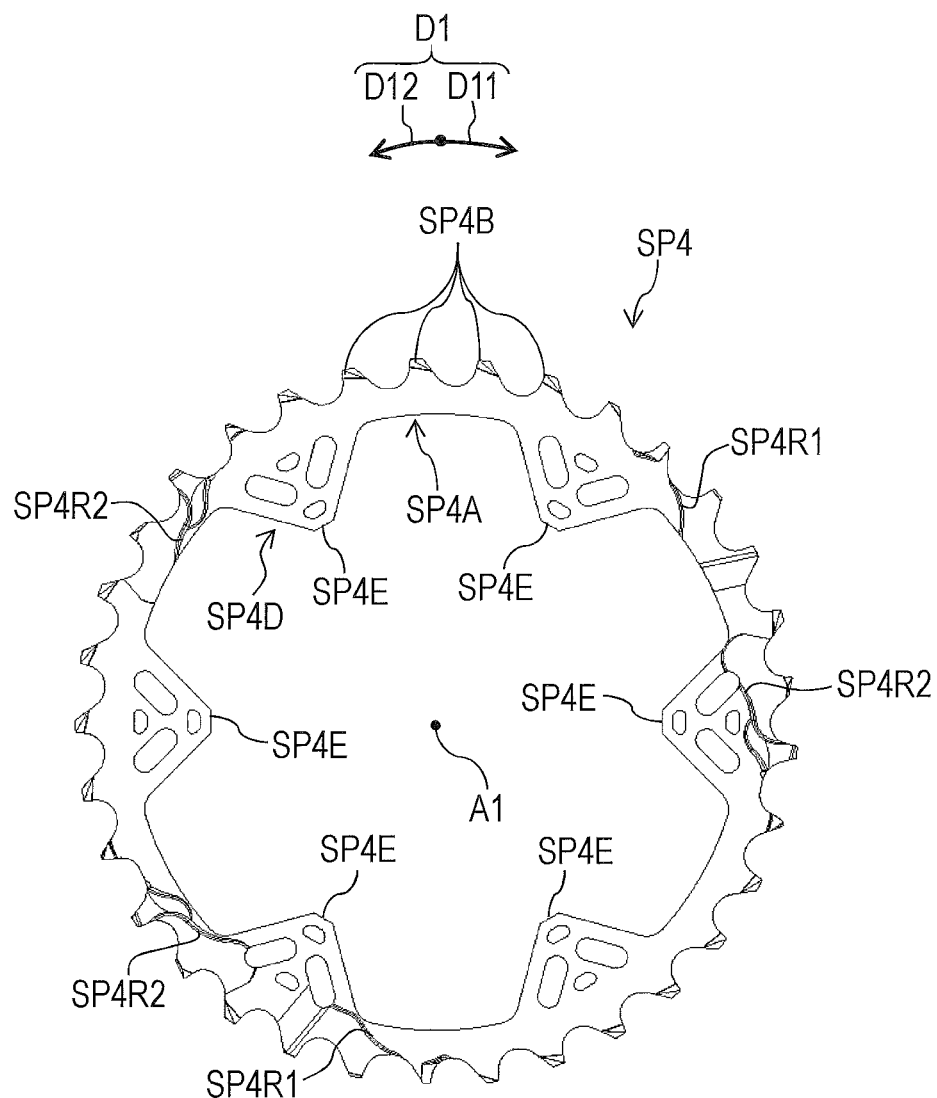
FIG. 10 is a side elevational view of a bicycle sprocket of the bicycle rear sprocket assembly illustrated in FIG. 1.

As seen in FIG. 10, the bicycle sprocket SP4 has the rotational center axis A1. The bicycle sprocket SP4 comprises a sprocket body SP4A and a plurality of sprocket teeth SP4B. The sprocket body SP4A is rotatable about the rotational center axis A1. The plurality of sprocket teeth SP4B extends radially outward from the sprocket body SP4A with respect to the rotational center axis A1.

The sprocket body SP4A includes a support attachment part SP4D attached to the sprocket support 12. The support attachment part SP4D includes a plurality of attachment portions SP4E attached to the plurality of support arms 18. A total number of the first attachment portions SP4E is equal to the total number of the support arms 18. However, the total number of the attachment portions SP4E is not limited to this embodiment. At least one of the attachment portions SP4E can be omitted from the bicycle sprocket SP4.

The bicycle sprocket SP4 further comprises an axially inward recess SP4R1 provided on the outward facing side SP4G to facilitate an inward shifting operation in which the bicycle chain 8 is shifted from the smaller sprocket SP5 to the bicycle sprocket SP4. The bicycle sprocket SP4 further comprises an axially outward recess SP4R2 provided on the outward facing side SP4G to facilitate an outward shifting operation in which the bicycle chain 8 is shifted from the bicycle sprocket SP4 to the smaller sprocket SP5.

In this embodiment, the bicycle sprocket SP4 comprises a plurality of axially inward recesses SP4R1 provided on the outward facing side SP4G to facilitate the inward shifting operation. The bicycle sprocket SP4 comprises a plurality of axially outward recesses SP4R2 provided on the outward facing side SP4G to facilitate the outward shifting operation. However, a total number of the axially inward recesses SP4R1 is not limited to this embodiment. A total number of the axially outward recesses SP4R2 is not limited to this embodiment.

Figure 11:
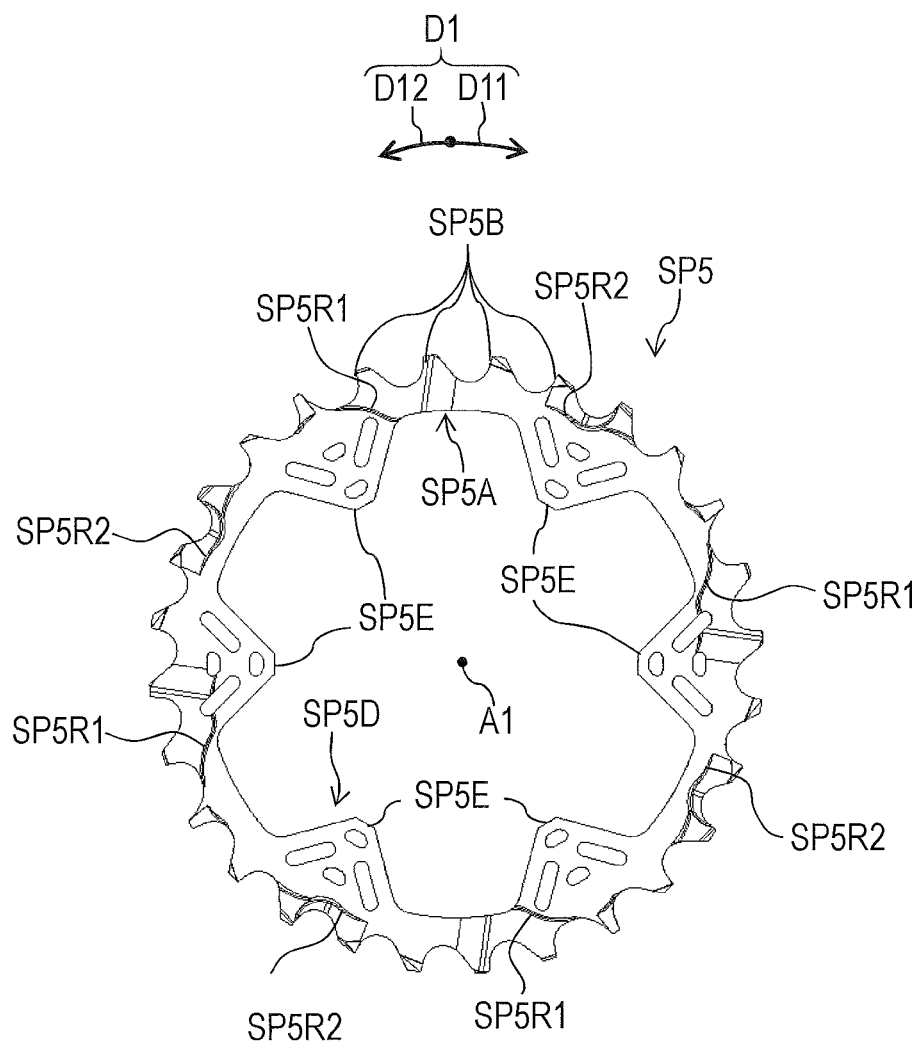
FIG. 11 is a side elevational view of a bicycle sprocket of the bicycle rear sprocket assembly illustrated in FIG. 1.

As seen in FIG. 11, the bicycle sprocket SP5 has the rotational center axis A1. The bicycle sprocket SP5 comprises a sprocket body SP5A and a plurality of sprocket teeth SP5B. The sprocket body SP5A is rotatable about the rotational center axis A1. The plurality of sprocket teeth SP5B extends radially outward from the sprocket body SP5A with respect to the rotational center axis A1.

The sprocket body SP5A includes a support attachment part SP5D attached to the sprocket support 12. The support attachment part SP5D includes a plurality of attachment portions SP5E attached to the plurality of support arms 18. A total number of the first attachment portions SP5E is equal to the total number of the support aims 18. However, the total number of the attachment portions SP5E is not limited to this embodiment. At least one of the attachment portions SP5E can be omitted from the bicycle sprocket SP5.

The bicycle sprocket SP5 further comprises an axially inward recess SP5R1 provided on the outward facing side SP5G to facilitate an inward shifting operation in which the bicycle chain 8 is shifted from the smaller sprocket SP6 to the bicycle sprocket SP5. The bicycle sprocket SP5 further comprises an axially outward recess SP5R2 provided on the outward facing side SP5G to facilitate an outward shifting operation in which the bicycle chain 8 is shifted from the bicycle sprocket SP5 to the smaller sprocket SP6.

In this embodiment, the bicycle sprocket SP5 comprises a plurality of axially inward recesses SP5R1 provided on the outward facing side SP5G to facilitate the inward shifting operation. The bicycle sprocket SP5 comprises a plurality of axially outward recesses SP5R2 provided on the outward facing side SP5G to facilitate the outward shifting operation. However, a total number of the axially inward recesses SP5R1 is not limited to this embodiment. A total number of the axially outward recesses SP5R2 is not limited to this embodiment.

Figure 12:
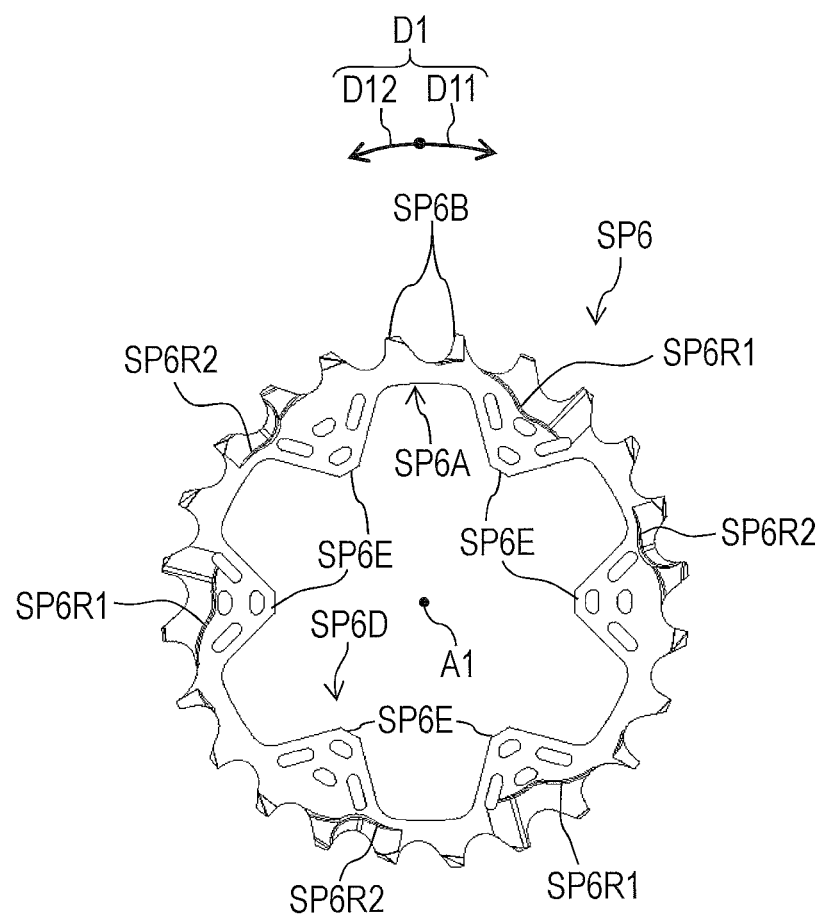
FIG. 12 is a side elevational view of a bicycle sprocket of the bicycle rear sprocket assembly illustrated in FIG. 1.

As seen in FIG. 12, the bicycle sprocket SP6 has the rotational center axis A1. The bicycle sprocket SP6 comprises a sprocket body SP6A and a plurality of sprocket teeth SP6B. The sprocket body SP6A is rotatable about the rotational center axis A1. The plurality of sprocket teeth SP6B extends radially outward from the sprocket body SP6A with respect to the rotational center axis A1.

The sprocket body SP6A includes a support attachment part SP6D attached to the sprocket support 12. The support attachment part SP6D includes a plurality of attachment portions SP6E attached to the plurality of support arms 18. A total number of the first attachment portions SP6E is equal to the total number of the support arms 18. However, the total number of the attachment portions SP6E is not limited to this embodiment. At least one of the attachment portions SP6E can be omitted from the bicycle sprocket SP6.

The bicycle sprocket SP6 further comprises an axially inward recess SP6R1 provided on the outward facing side SP6G to facilitate an inward shifting operation in which the bicycle chain 8 is shifted from the smaller sprocket SP7 to the bicycle sprocket SP6. The bicycle sprocket SP6 further comprises an axially outward recess SP6R2 provided on the outward facing side SP6G to facilitate an outward shifting operation in which the bicycle chain 8 is shifted from the bicycle sprocket SP6 to the smaller sprocket SP7.

In this embodiment, the bicycle sprocket SP6 comprises a plurality of axially inward recesses SP6R1 provided on the outward facing side SP6G to facilitate the inward shifting operation. The bicycle sprocket SP6 comprises a plurality of axially outward recesses SP6R2 provided on the outward facing side SP6G to facilitate the outward shifting operation. However, a total number of the axially inward recesses SP6R1 is not limited to this embodiment. A total number of the axially outward recesses SP6R2 is not limited to this embodiment.

Figure 13:
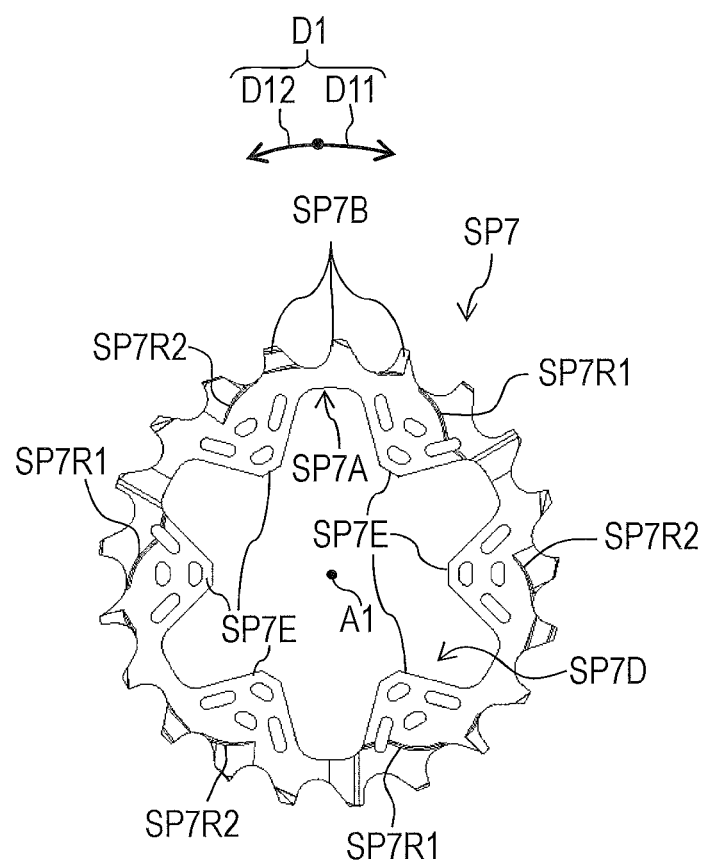
FIG. 13 is a side elevational view of a bicycle sprocket of the bicycle rear sprocket assembly illustrated in FIG. 1.

As seen in FIG. 13, the bicycle sprocket SP7 has the rotational center axis A1. The bicycle sprocket SP7 comprises a sprocket body SP7A and a plurality of sprocket teeth SP7B. The sprocket body SP7A is rotatable about the rotational center axis A1. The plurality of sprocket teeth SP7B extends radially outward from the sprocket body SP7A with respect to the rotational center axis A1.

The sprocket body SP7A includes a support attachment part SP7D attached to the sprocket support 12. The support attachment part SP7D includes a plurality of attachment portions SP7E attached to the plurality of support arms 18. A total number of the first attachment portions SP7E is equal to the total number of the support arms 18. However, the total number of the attachment portions SP7E is not limited to this embodiment. At least one of the attachment portions SP7E can be omitted from the bicycle sprocket SP7.

The bicycle sprocket SP7 further comprises an axially inward recess SP7R1 provided on the outward facing side SP7G to facilitate an inward shifting operation in which the bicycle chain 8 is shifted from the smaller sprocket SP8 to the bicycle sprocket SP7. The bicycle sprocket SP7 further comprises an axially outward recess SP7R2 provided on the outward facing side SP7G to facilitate an outward shifting operation in which the bicycle chain 8 is shifted from the bicycle sprocket SP7 to the smaller sprocket SP8.

In this embodiment, the bicycle sprocket SP7 comprises a plurality of axially inward recesses SP7R1 provided on the outward facing side SP7G to facilitate the inward shifting operation. The bicycle sprocket SP7 comprises a plurality of axially outward recesses SP7R2 provided on the outward facing side SP7G to facilitate the outward shifting operation. However, a total number of the axially inward recesses SP7R1 is not limited to this embodiment. A total number of the axially outward recesses SP7R2 is not limited to this embodiment.

Figure 14:
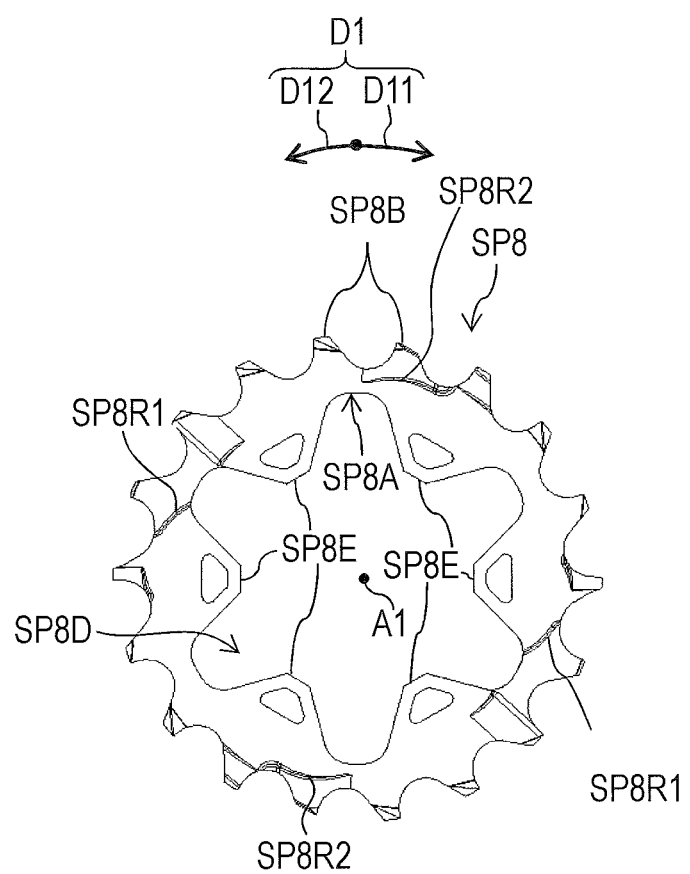
FIG. 14 is a side elevational view of a bicycle sprocket of the bicycle rear sprocket assembly illustrated in FIG. 1.

As seen in FIG. 14, the bicycle sprocket SP8 has the rotational center axis A1. The bicycle sprocket SP8 comprises a sprocket body SP8A and a plurality of sprocket teeth SP8B. The sprocket body SP8A is rotatable about the rotational center axis A1. The plurality of sprocket teeth SP8B extends radially outward from the sprocket body SP8A with respect to the rotational center axis A1.

The sprocket body SP8A includes a support attachment part SP8D attached to the sprocket support 12. The support attachment part SP8D includes a plurality of attachment portions SP8E attached to the plurality of support arms 18. A total number of the first attachment portions SP8E is equal to the total number of the support arms 18. However, the total number of the attachment portions SP8E is not limited to this embodiment. At least one of the attachment portions SP8E can be omitted from the bicycle sprocket SP8.

The bicycle sprocket SP8 further comprises an axially inward recess SP8R1 provided on the outward facing side SP8G to facilitate an inward shifting operation in which the bicycle chain 8 is shifted from the smaller sprocket SP9 to the bicycle sprocket SP8. The bicycle sprocket SP8 further comprises an axially outward recess SP8R2 provided on the outward facing side SP8G to facilitate an outward shifting operation in which the bicycle chain 8 is shifted from the bicycle sprocket SP8 to the smaller sprocket SP9.

In this embodiment, the bicycle sprocket SP8 comprises a plurality of axially inward recesses SP8R1 provided on the outward facing side SP8G to facilitate the inward shifting operation. The bicycle sprocket SP8 comprises a plurality of axially outward recesses SP8R2 provided on the outward facing side SP8G to facilitate the outward shifting operation. However, a total number of the axially inward recesses SP8R1 is not limited to this embodiment. A total number of the axially outward recesses SP8R2 is not limited to this embodiment.

Figure 15:
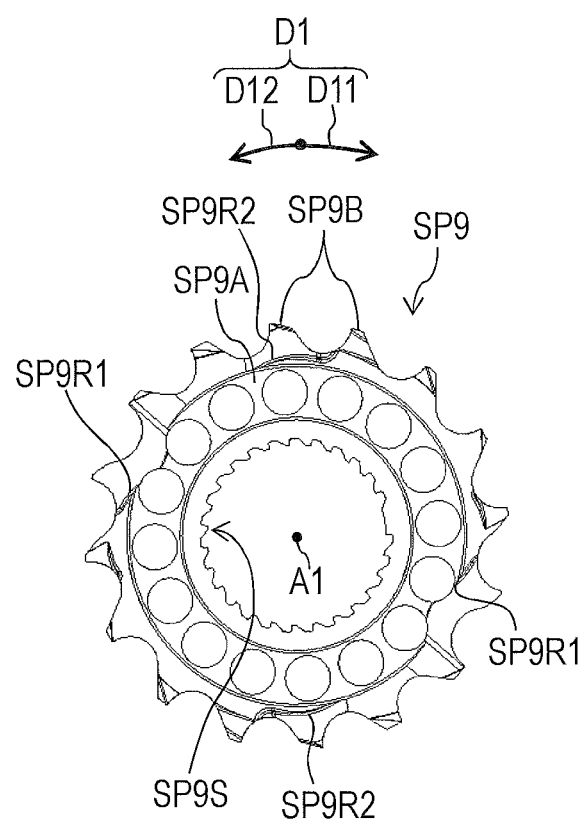
FIG. 15 is a side elevational view of a bicycle sprocket of the bicycle rear sprocket assembly illustrated in FIG. 1.

As seen in FIG. 15, the bicycle sprocket SP9 has the rotational center axis A1. The bicycle sprocket SP9 comprises a sprocket body SP9A and a plurality of sprocket teeth SP9B. The sprocket body SP9A is rotatable about the rotational center axis A1. The plurality of sprocket teeth SP9B extends radially outward from the sprocket body SP9A with respect to the rotational center axis A1. The bicycle sprocket SP9 includes an internal spline SP9S engageable with the external spline 4A of the bicycle hub assembly 2 (FIG. 1).

The bicycle sprocket SP9 further comprises an axially inward recess SP9R1 provided on the outward facing side SP9G to facilitate an inward shifting operation in which the bicycle chain 8 is shifted from the smaller sprocket SP10 to the bicycle sprocket SP9. The bicycle sprocket SP9 further comprises an axially outward recess SP9R2 provided on the outward facing side SP9G to facilitate an outward shifting operation in which the bicycle chain 8 is shifted from the bicycle sprocket SP9 to the smaller sprocket SP10.

In this embodiment, the bicycle sprocket SP9 comprises a plurality of axially inward recesses SP9R1 provided on the outward facing side SP9G to facilitate the inward shifting operation. The bicycle sprocket SP9 comprises a plurality of axially outward recesses SP9R2 provided on the outward facing side SP9G to facilitate the outward shifting operation. However, a total number of the axially inward recesses SP9R1 is not limited to this embodiment. A total number of the axially outward recesses SP9R2 is not limited to this embodiment.

Figure 16:
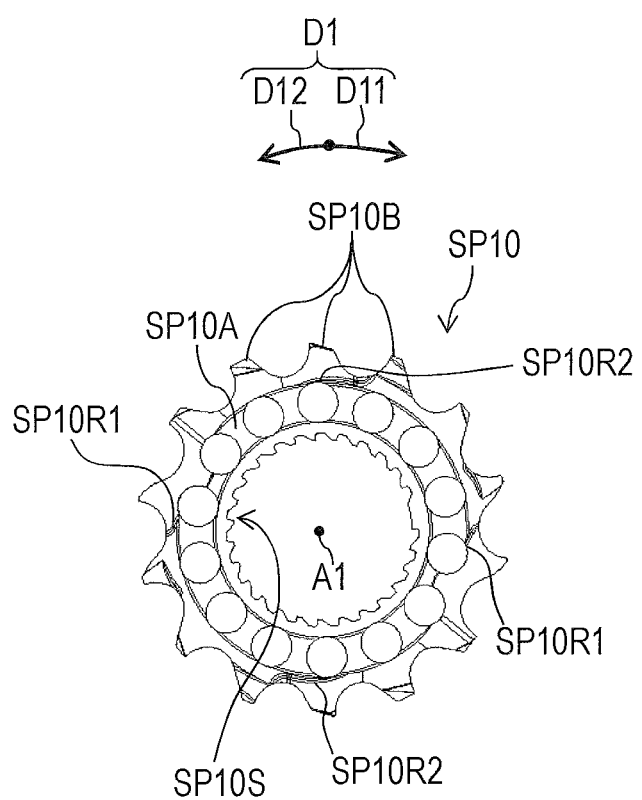
FIG. 16 is a side elevational view of a bicycle sprocket of the bicycle rear sprocket assembly illustrated in FIG. 1.

As seen in FIG. 16 the bicycle sprocket SP10 has the rotational center axis A1. The bicycle sprocket SP10 comprises a sprocket body SP10A and a plurality of sprocket teeth SP10B. The sprocket body SP10A is rotatable about the rotational center axis A1. The plurality of sprocket teeth SP10B extends radially outward from the sprocket body SP10A with respect to the rotational center axis A1. The bicycle sprocket SP10 includes an internal spline SP10S engageable with the external spline 4A of the bicycle hub assembly 2 (FIG. 1).

The bicycle sprocket SP10 further comprises an axially inward recess SP10R1 provided on the outward facing side SP10G to facilitate an inward shifting operation in which the bicycle chain 8 is shifted from the smaller sprocket SP11 to the bicycle sprocket SP10. The bicycle sprocket SP10 further comprises an axially outward recess SP10R2 provided on the outward facing side SP10G to facilitate an outward shifting operation in which the bicycle chain 8 is shifted from the bicycle sprocket SP10 to the smaller sprocket SP11.

In this embodiment, the bicycle sprocket SP10 comprises a plurality of axially inward recesses SP10R1 provided on the outward facing side SP10G to facilitate the inward shifting operation. The bicycle sprocket SP10 comprises a plurality of axially outward recesses SP10R2 provided on the outward facing side SP to facilitate the outward shifting operation. However, a total number of the axially inward recesses SP10R1 is not limited to this embodiment. A total number of the axially outward recesses SP10R2 is not limited to this embodiment.

Figure 17:
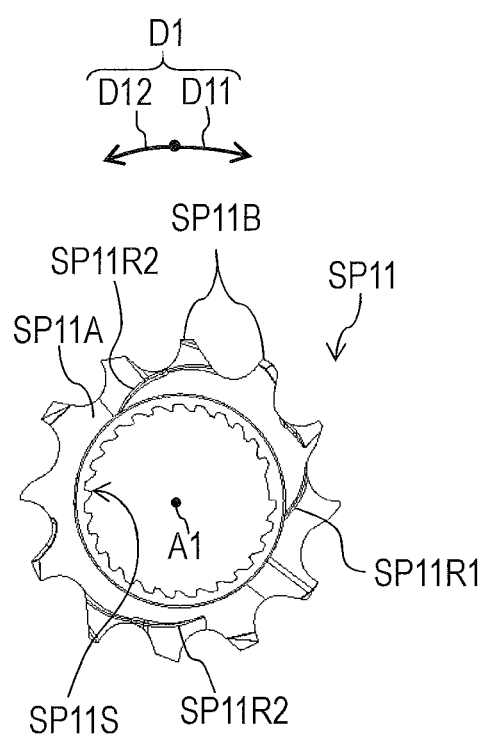
FIG. 17 is a side elevational view of a bicycle sprocket of the bicycle rear sprocket assembly illustrated in FIG. 1.

As seen in FIG. 17, the bicycle sprocket SP11 has the rotational center axis A1. The bicycle sprocket SP11 comprises a sprocket body SP11A and a plurality of sprocket teeth SP11B. The sprocket body SP11A is rotatable about the rotational center axis A1. The plurality of sprocket teeth SP11B extends radially outward from the sprocket body SP11A with respect to the rotational center axis A1. The bicycle sprocket SP11 includes an internal spline SP11S engageable with the external spline 4A of the bicycle hub assembly 2 (FIG. 1).

The bicycle sprocket SP11 further comprises an axially inward recess SP11R1 provided on the outward facing side SP11G to facilitate an inward shifting operation in which the bicycle chain 8 is shifted from the smaller sprocket SP12 to the bicycle sprocket SP11. The bicycle sprocket SP11 further comprises an axially outward recess SP11R2 provided on the outward facing side SP11G to facilitate an outward shifting operation in which the bicycle chain 8 is shifted from the bicycle sprocket SP11 to the smaller sprocket SP12.

In this embodiment, the bicycle sprocket SP11 comprises a plurality of axially inward recesses SP11R1 provided on the outward facing side SP11G to facilitate the inward shifting operation. However, a total number of the axially inward recesses SP11R1 is not limited to this embodiment. A total number of the axially outward recess SP11R2 is not limited to this embodiment.

Figure 18:
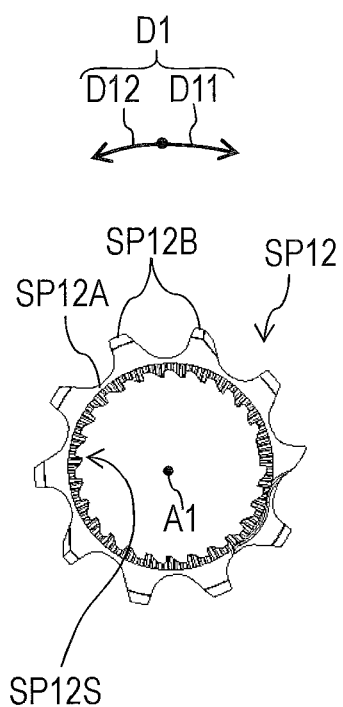
FIG. 18 is a side elevational view of a bicycle sprocket of the bicycle rear sprocket assembly illustrated in FIG. 1.

As seen in FIG. 18, the bicycle sprocket SP12 has the rotational center axis A1. The bicycle sprocket SP12 comprises a sprocket body SP12A and a plurality of sprocket teeth SP12B. The sprocket body SP12A is rotatable about the rotational center axis A1. The plurality of sprocket teeth SP12B extends radially outward from the sprocket body SP12A with respect to the rotational center axis A1. The bicycle sprocket SP12 includes an internal spline SP12S engageable with the external spline 4A of the bicycle hub assembly 2 (FIG. 1).

As seen in FIGS. 7 to 18, each of the sprocket bodies SP1A to SP12A has an annular shape. However, the shape of each of the bicycle sprockets SP1 to SP12 is not limited to this embodiment.

Figure 19:
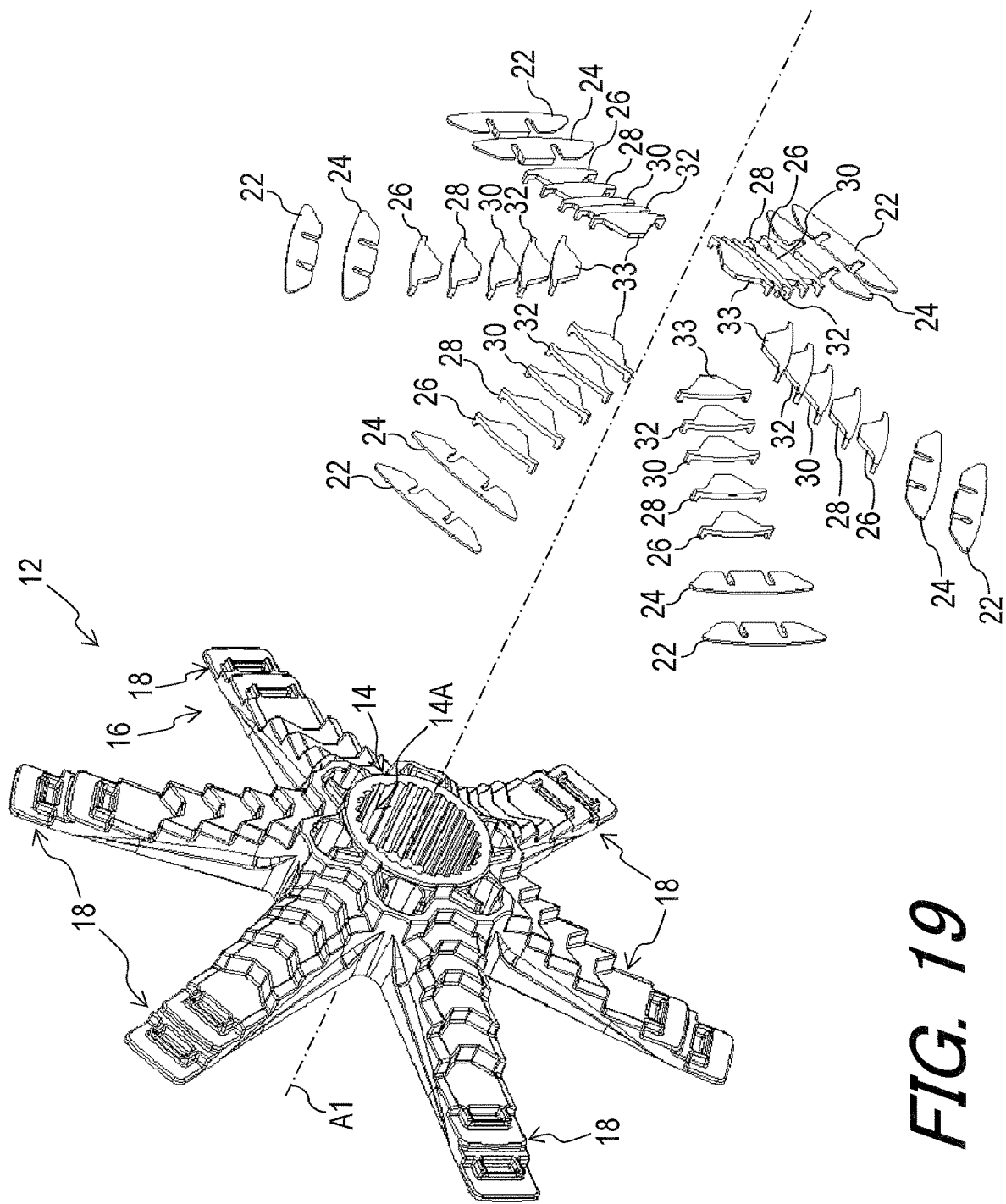
FIG. 19 is a perspective view of a sprocket support and a plurality of spacers of the bicycle rear sprocket assembly illustrated in FIG. 1.
Figure 20:
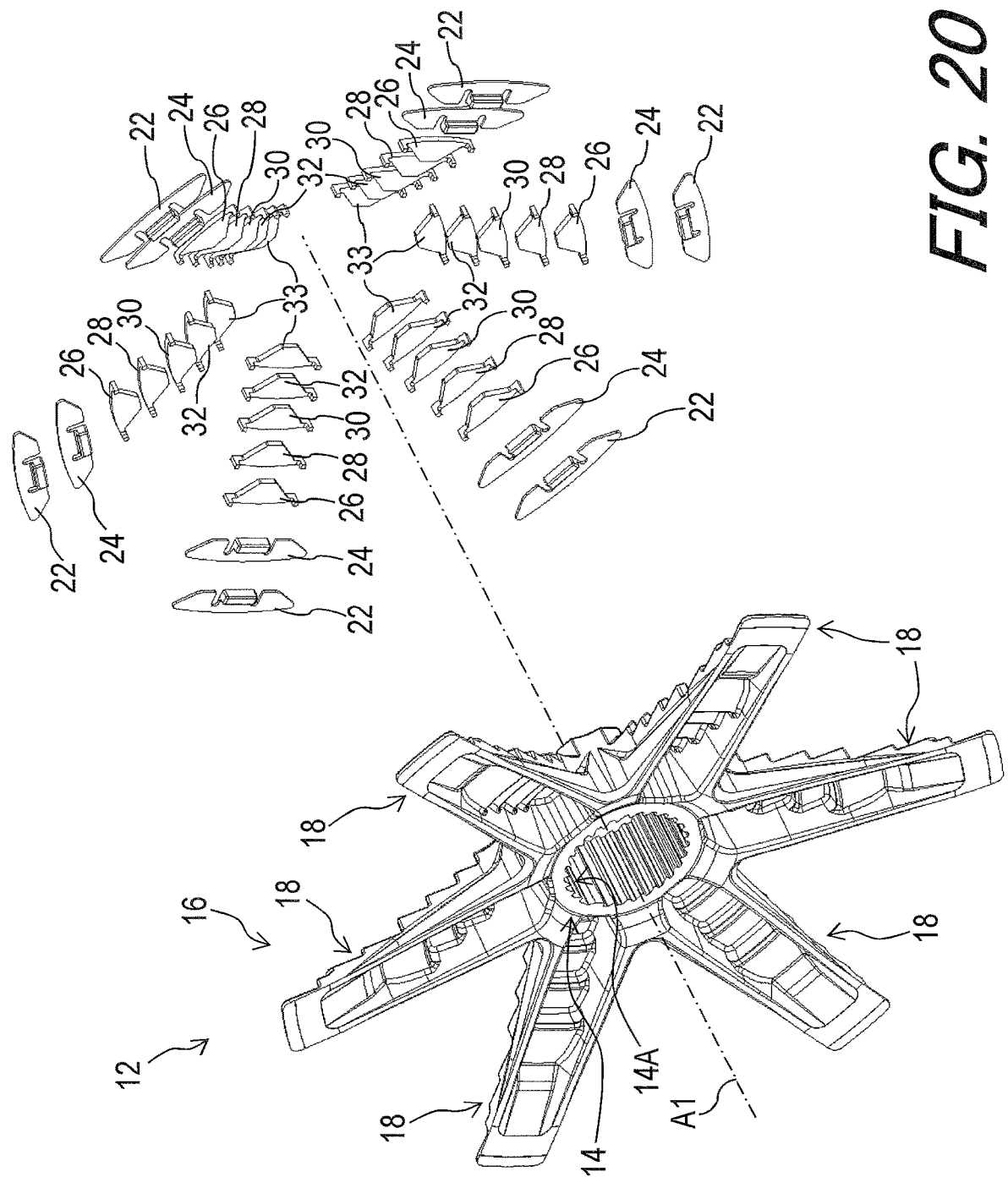
FIG. 20 is another perspective view of the sprocket support and the plurality of spacers of the bicycle rear sprocket assembly illustrated in FIG. 1.

As seen in FIGS. 19 and 20, the bicycle rear sprocket assembly 10 comprises a plurality of first spacers 22, a plurality of second spacers 24, a plurality of third spacers 26, a plurality of fourth spacers 28, a plurality of fifth spacers 30, a plurality of sixth spacers 32, and a plurality of seventh spacers 33. Each of the first to seventh spacers 22 to 33 is made of a non-metallic material such as a resin material. However, the first to seventh spacers 22 to 33 can be made of a metallic material.

A total number of the first spacers 22 is equal to the total number of the support arms 18. A total number of the second spacers 24 is equal to the total number of the support arms 18. A total number of the third spacers 26 is equal to the total number of the support arms 18. A total number of the fourth spacers 28 is equal to the total number of the support arms 18. A total number of the fifth spacers 30 is equal to the total number of the support arms 18. A total number of the sixth spacers 32 is equal to the total number of the support arms 18. A total number of the seventh spacers 33 is equal to the total number of the support arms 18. However, the total number of the first spacers 22 is not limited to this embodiment. The total number of the second spacers 24 is not limited to this embodiment. The total number of the third spacers 26 is not limited to this embodiment. The total number of the fourth spacers 28 is not limited to this embodiment. The total number of the fifth spacers 30 is not limited to this embodiment. The total number of the sixth spacers 32 is not limited to this embodiment. The total number of the seventh spacers 33 is not limited to this embodiment.

As seen in FIG. 6, the bicycle sprocket SP1 comprises an axially outward protuberance SP1X. The axially outward protuberance SP1X is disposed on the outward facing side SP1G of the sprocket body SP1A. The bicycle sprocket SP1 comprises an axially inward protuberance SP1Y. The axially inward protuberance SP1Y is disposed on the inward facing side SP1H of the sprocket body SP1A. The axially outward protuberance SP1X protrudes from the sprocket body SP1A in the axial direction D2. The axially outward protuberance SP1Y protrudes from the sprocket body SP1A in the axial direction D2. The axially outward protuberance SP1X protrudes from the sprocket body SP1A beyond the plurality of sprocket teeth SP1B in the axial direction D2. The axially inward protuberance SP1Y protrudes from the sprocket body SP1A beyond the plurality of sprocket teeth SP1B in the axial direction D2.

The bicycle sprocket SP2 comprises an axially outward protuberance SP2X. The axially outward protuberance SP2X is disposed on the outward facing side SP2G of the sprocket body SP2A. The bicycle sprocket SP2 comprises an axially inward protuberance SP2Y. The axially inward protuberance SP2Y is disposed on the inward facing side SP2H of the sprocket body SP2A. The axially outward protuberance SP2X protrudes from the sprocket body SP2A in the axial direction D2. The axially outward protuberance SP2Y protrudes from the sprocket body SP2A in the axial direction D2. The axially outward protuberance SP2X protrudes from the sprocket body SP2A beyond the plurality of sprocket teeth SP2B in the axial direction D2. The axially inward protuberance SP2Y protrudes from the sprocket body SP2A beyond the plurality of sprocket teeth SP2B in the axial direction D2.

The bicycle sprocket SP3 comprises an axially outward protuberance SP3X. The axially outward protuberance SP3X is disposed on the outward facing side SP3G of the sprocket body SP3A. The bicycle sprocket SP3 comprises an axially inward protuberance SP3Y. The axially inward protuberance SP3Y is disposed on the inward facing side SP3H of the sprocket body SP3A. The axially outward protuberance SP3X protrudes from the sprocket body SP3A in the axial direction D2. The axially outward protuberance SP3Y protrudes from the sprocket body SP3A in the axial direction D2. The axially outward protuberance SP3X protrudes from the sprocket body SP3A beyond the plurality of sprocket teeth SP3B in the axial direction D2. The axially inward protuberance SP3Y protrudes from the sprocket body SP3A beyond the plurality of sprocket teeth SP3B in the axial direction D2.

As seen in FIG. 7, the axially outward protuberance SP1X has a substantially annular shape. The plurality of axially inward recesses SP1R1 and the plurality of axially outward recesses SP1R2 are provided on the axially outward protuberance SP1X. The axially outward protuberance SP1X is divided into a plurality of axially outward protruding parts SP1X1 by the plurality of axially outward recesses SP1R2. However, the axially outward protuberance SP1X can have an annular shape. The axially outward protuberance SP1X can be continuously provided in the circumferential direction D1.

Figure 21:
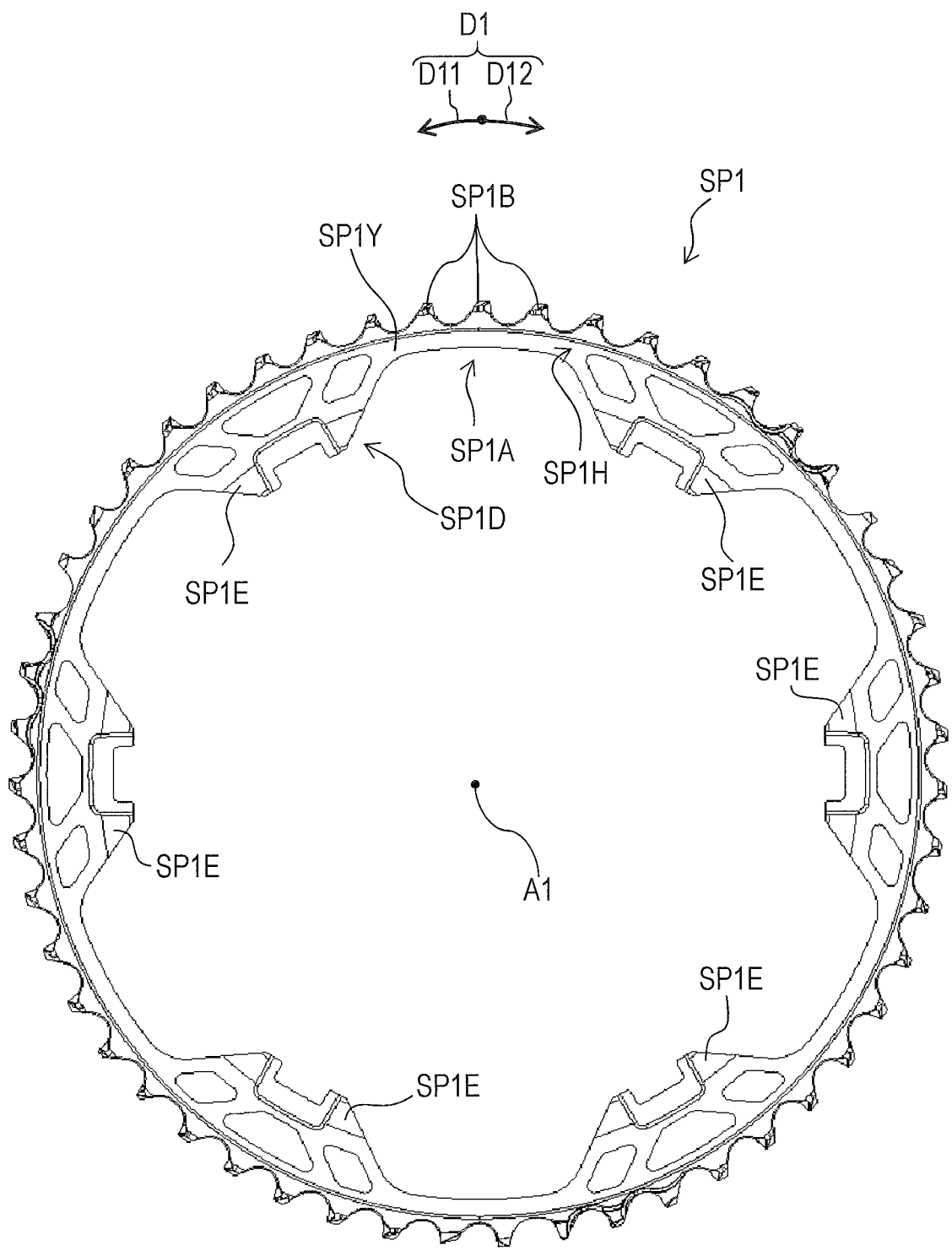
FIG. 21 is another side elevational view of the bicycle sprocket illustrated in FIG. 7.

As seen in FIG. 21, the bicycle sprocket SP1 comprises the inward protuberance SP1Y disposed on the inward facing side SP1H of the sprocket body SP1A. The axially inward protuberance SP1Y has an annular shape and is continuously provided in the circumferential direction D1. However, the shape of the axially inward protuberance SP1Y is not limited to this embodiment. The axially inward protuberance SP1Y can be divided into a plurality of axially inward protruding parts.

As seen in FIG. 8, the axially outward protuberance SP2X has a substantially annular shape. The plurality of axially inward recesses SP2R1 and the plurality of axially outward recesses SP2R2 are provided on the axially outward protuberance SP2X. The axially outward protuberance SP2X is divided into a plurality of axially outward protruding parts SP2X1 and SP2X2 by the plurality of axially inward recesses SP2R1 and the plurality of axially inward recessed SP2R2. However, the axially outward protuberance SP2X can have an annular shape. The axially outward protuberance SP2X can be continuously provided in the circumferential direction D1.

Figure 22:
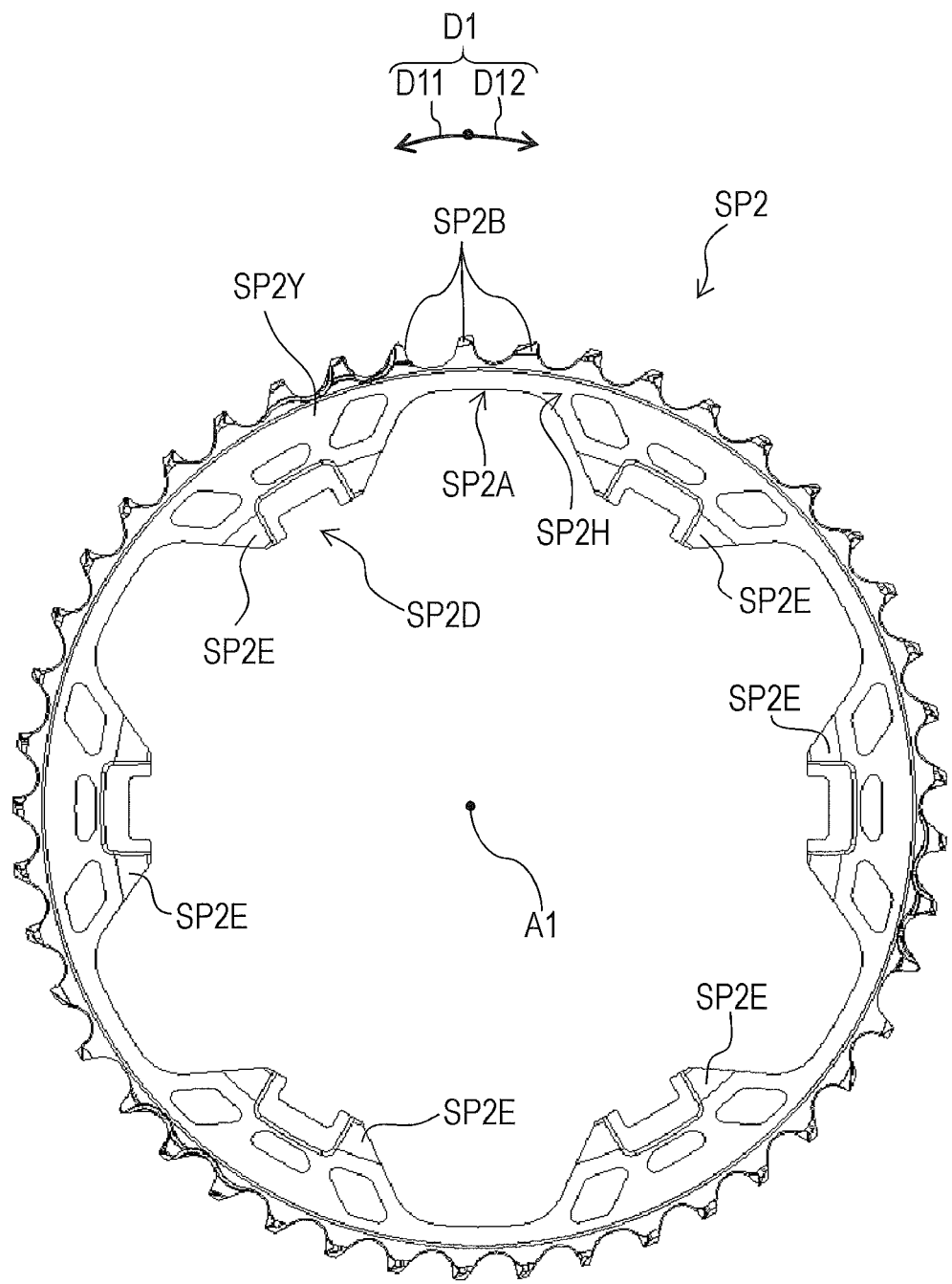
FIG. 22 is another side elevational view of the bicycle sprocket illustrated in FIG. 8.

As seen in FIG. 22, the bicycle sprocket SP2 comprises the inward protuberance SP2Y disposed on the inward facing side SP2H of the sprocket body SP2A. The axially inward protuberance SP2Y has an annular shape and is continuously provided in the circumferential direction D1. However, the shape of the axially inward protuberance SP2Y is not limited to this embodiment. The axially inward protuberance SP2Y can be divided into a plurality of axially inward protruding parts.

As seen in FIG. 9, the axially outward protuberance SP3X has a substantially annular shape. The plurality of axially inward recesses SP3R1 and the plurality of axially outward recesses SP3R2 are provided on the axially outward protuberance SP3X. The axially outward protuberance SP3X is divided into a plurality of axially outward protruding parts SP3X1 and SP3X2 by the plurality of axially inward recesses SP3R1 and the plurality of axially outward recesses SP3R2. However, the axially outward protuberance SP3X can have an annular shape. The axially outward protuberance SP3X can be continuously provided in the circumferential direction D1.

Figure 23:
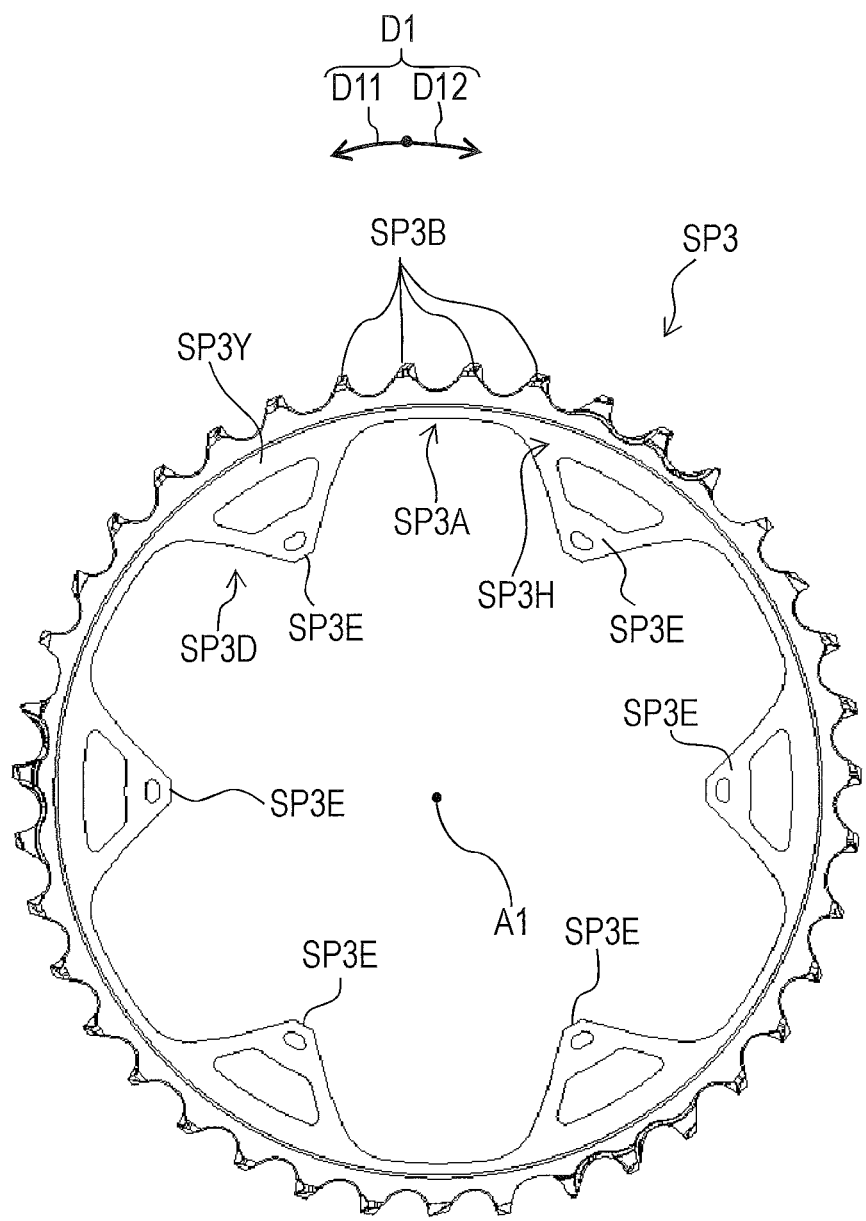
FIG. 23 is another side elevational view of the bicycle sprocket illustrated in FIG. 9.

As seen in FIG. 23, the bicycle sprocket SP3 comprises the inward protuberance SP3Y disposed on the inward facing side SP3H of the sprocket body SP3A. The axially inward protuberance SP3Y has an annular shape and is continuously provided in the circumferential direction D1. However, the shape of the axially inward protuberance SP3Y is not limited to this embodiment. The axially inward protuberance SP3Y can be divided into a plurality of axially inward protruding parts.

Figure 24:
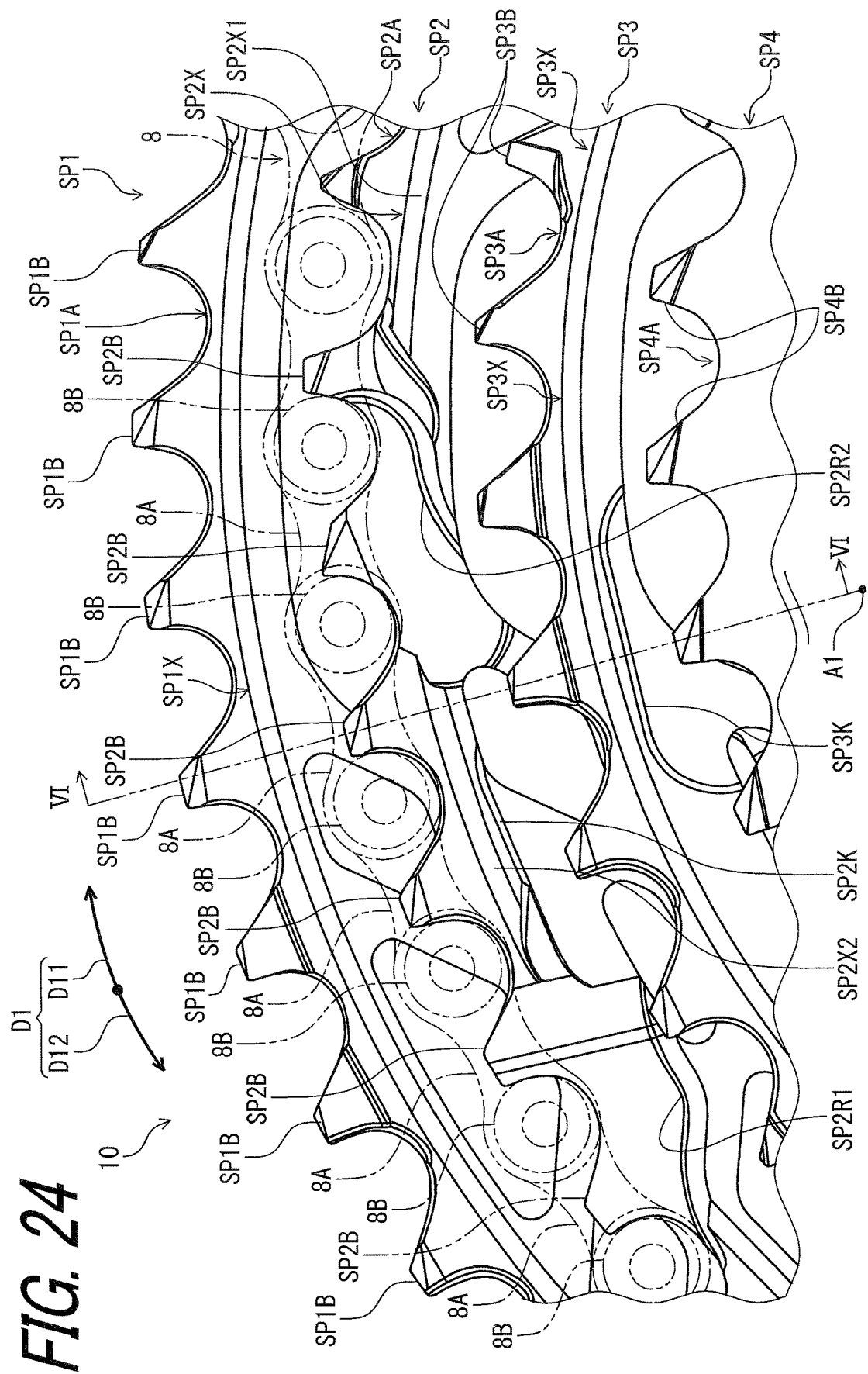
FIG. 24 is a partial side elevational view of the bicycle rear sprocket assembly illustrated in FIG. 1, with a bicycle chain.

As seen in FIGS. 6 and 24, the axially outward protuberance SP1X is disposed on the outward facing side SP1G of the sprocket body SP1A to overlap at least partly with the bicycle chain 8 engaging with the neighboring bicycle sprocket SP2 when viewed along the rotational center axis A1. For example, the axially outward protuberance SP1X overlap at least partly with a link plate 8A coupled to a roller 8B engaged with the sprocket tooth SP2B of the neighboring bicycle sprocket SP2.

In this embodiment, the axially outward protuberance SP1X is disposed on the outward facing side SP of the sprocket body SP1A to overlap partly with the bicycle chain 8 engaging with the neighboring bicycle sprocket SP2 when viewed along the rotational center axis A1. However, the axially outward protuberance SP1X can be disposed on the outward facing side SP of the sprocket body SP1A to overlap entirely with the bicycle chain 8 engaging with the neighboring bicycle sprocket SP2 when viewed along the rotational center axis A1.

As seen in FIG. 6, the neighboring bicycle sprocket SP2 is adjacent to the bicycle sprocket SP1 without another sprocket between the bicycle sprocket SP1 and the neighboring bicycle sprocket SP2 in the axial direction D2. The neighboring bicycle sprocket SP2 can also be referred to as a neighboring smaller bicycle sprocket SP2. The neighboring smaller bicycle sprocket SP2 is adjacent to the outward facing side SP1G of the bicycle sprocket SP1 without another sprocket between the bicycle sprocket SP1 and the neighboring bicycle sprocket SP2 in the axial direction D2.

Figure 25:
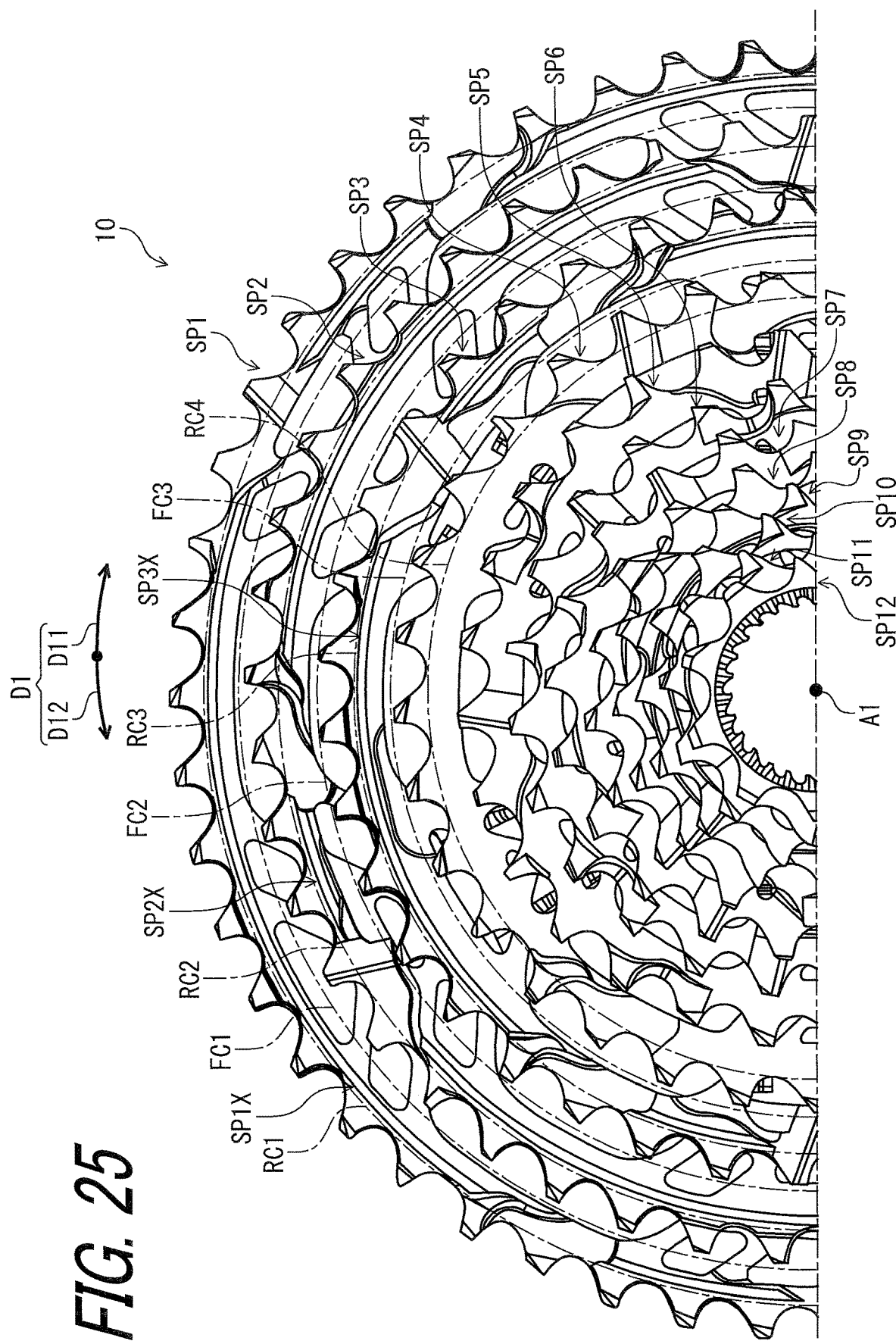
FIG. 25 is a partial side elevational view of the bicycle rear sprocket assembly illustrated in FIG. 1.
Figure 26:
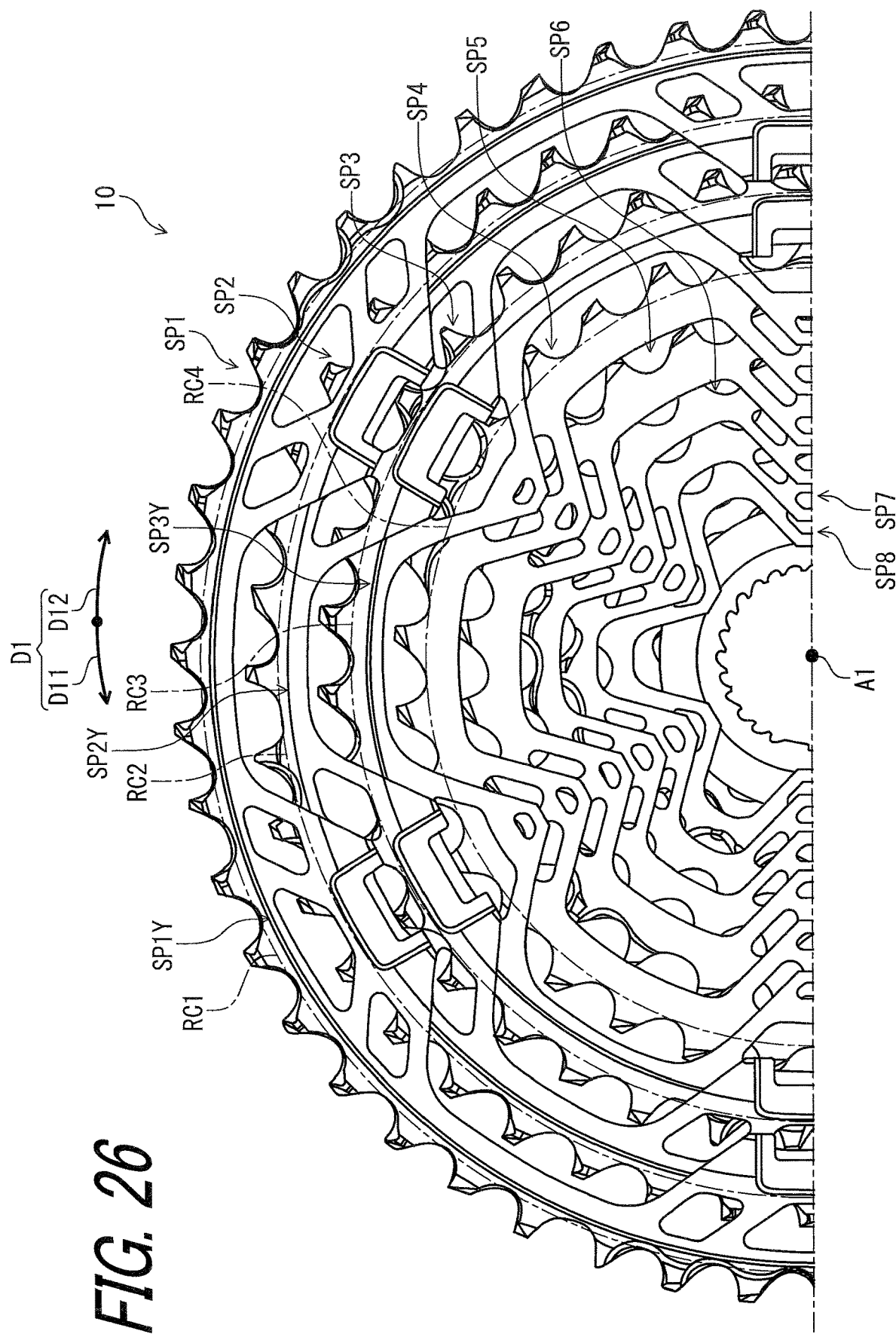
FIG. 26 is another partial side elevational view of the bicycle rear sprocket assembly illustrated in FIG. 1, with the sprocket support omitted.

As seen in FIGS. 25 and 26, at least one of the axially outward protuberance SP1X and the axially inward protuberance SP1Y is provided radially inwardly of a root circle RC1 of the bicycle sprocket SP1. In this embodiment, as seen in FIG. 25, the axially outward protuberance SP1X is provided radially inwardly of the root circle RC1 of the bicycle sprocket SP1. However, the axially outward protuberance SP1X can be at least partly provided radially outwardly of the root circle RC1 of the bicycle sprocket SP1.

As seen in FIG. 25, the axially outward protuberance SP1X is provided radially between the root circle RC1 of the bicycle sprocket SP1 and a neighboring smaller root circle RC2 of the neighboring smaller bicycle sprocket SP2 when viewed along the rotational center axis A1. The axially outward protuberance SP1X is at least partly provided radially outwardly of a reference circle FC1 which is defined radially inwardly from the root circle RC1 of the bicycle sprocket SP1 by 10 mm. The axially outward protuberance SP1X is partly provided radially outwardly of a reference circle FC1. However, the axially outward protuberance SP1X can be at least partly provided outside an area defined radially between the root circle RC1 and the neighboring smaller root circle RC2 when viewed along the rotational center axis A1. The axially outward protuberance SP1X can be entirely provided radially outwardly of the reference circle FC1.

As seen in FIG. 6, a radially outer edge of the axially inward protuberance SP1Y is provided at a radial position which is substantially the same as a radial position of a radially outer edge of the axially outward protuberance SP1X. As seen in FIGS. 7 and 21, the axially inward protuberance SP1Y is disposed on the inward facing side SP1H of the sprocket body SP1A to overlap at least partly with the axially outward protuberance SP1X when viewed along the rotational center axis A1. The axially inward protuberance SP1Y is disposed on the inward facing side SP1H of the sprocket body SP1A to overlap partly with the axially outward protuberance SP1X when viewed along the rotational center axis A1. However, the axially inward protuberance SP1Y is disposed on the inward facing side SP1H of the sprocket body SP1A to overlap entirely with the axially outward protuberance SP1X when viewed along the rotational center axis A1.

Figure 27:
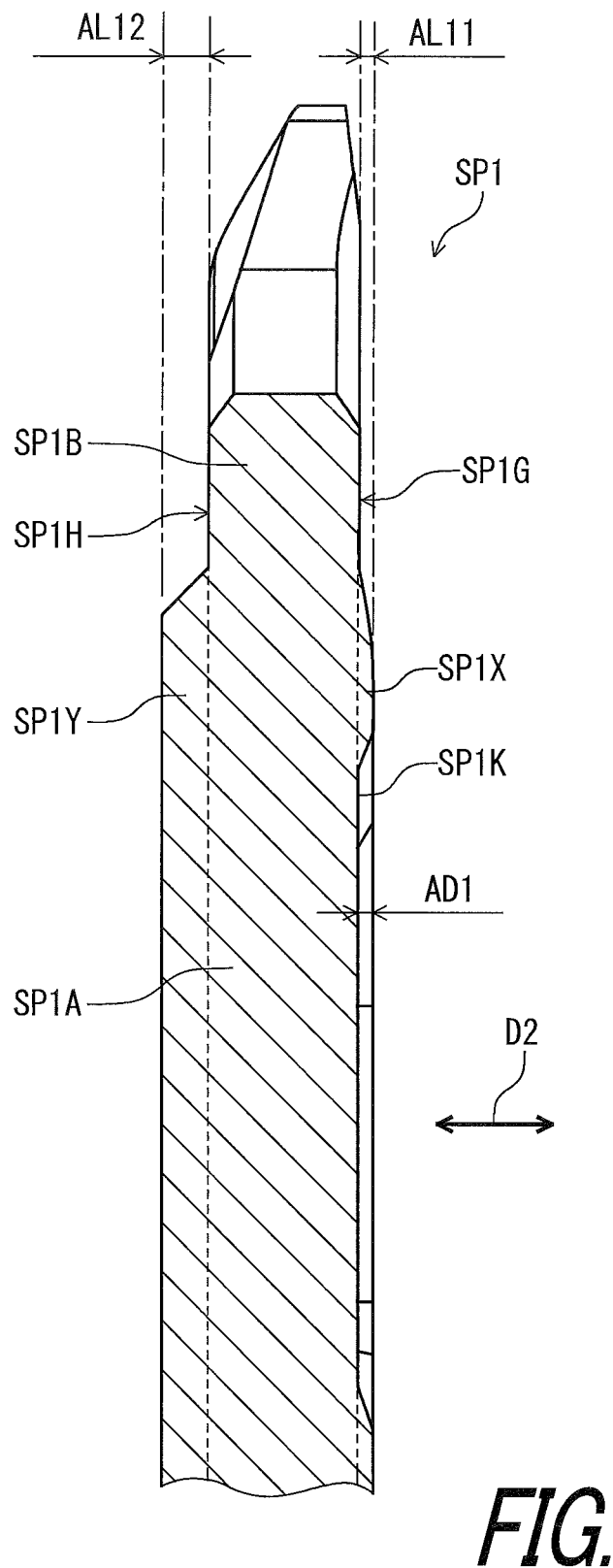
FIG. 27 is a cross-sectional view of the bicycle sprocket taken along line XXVII-XXVII of FIG. 7.

As seen in FIG. 27, the axially outward protuberance SP1X has a first axial length AL11 defined from the sprocket body SP1A in the axial direction D2. The axially inward protuberance SP1Y has a second axial length AL12 defined from the sprocket body SP1A in the axial direction D2. The first axial length AL11 is different from the second axial length AL12. In this embodiment, the first axial length AL11 is smaller than the second axial length AL12. However, the first axial length AL11 can be equal to or larger than the second axial length AL12. For example, the first axial length AL11 is larger than 0.1 mm and smaller than 0.5 mm. The second axial length AL12 is larger than 0.3 mm and smaller than 1 mm. The first axial length AL11 is 0.2 mm. The second axial length AL12 is 0.6 mm. However, the first axial length AL11 is not limited to this embodiment and the above range. The second axial length AL12 is not limited to this embodiment and the above range.

As seen in FIG. 7, the axially outward protuberance SP1X includes a recess SP1K to reduce interference between the bicycle chain 8 and the axially outward protuberance SP1X in a shifting operation in which the bicycle chain 8 is shifted from the neighboring bicycle sprocket SP2 to an additional neighboring bicycle sprocket SP3. As seen in FIG. 6, the additional neighboring bicycle sprocket SP3 is adjacent to the neighboring bicycle sprocket SP2 without another sprocket between the neighboring bicycle sprocket SP2 and the additional neighboring bicycle sprocket SP3 in the axial direction D2. In this embodiment, as seen in FIG. 7, the axially outward protuberance SP1X includes a plurality of recesses SP1K to reduce interference between the bicycle chain 8 and the axially outward protuberance SP1X in the shifting operation. However, a total number of the recesses SP1K is not limited to this embodiment.

As seen in FIG. 27, the recess SP has an axial depth AD1 defined in the axial direction D2. The axial depth AD1 is equal to or larger than the first axial length AL11. In this embodiment, the axial depth AD1 is equal to the first axial length AL11. However, the axial depth AD1 can be larger or smaller than the first axial length AL11.

Figure 28:
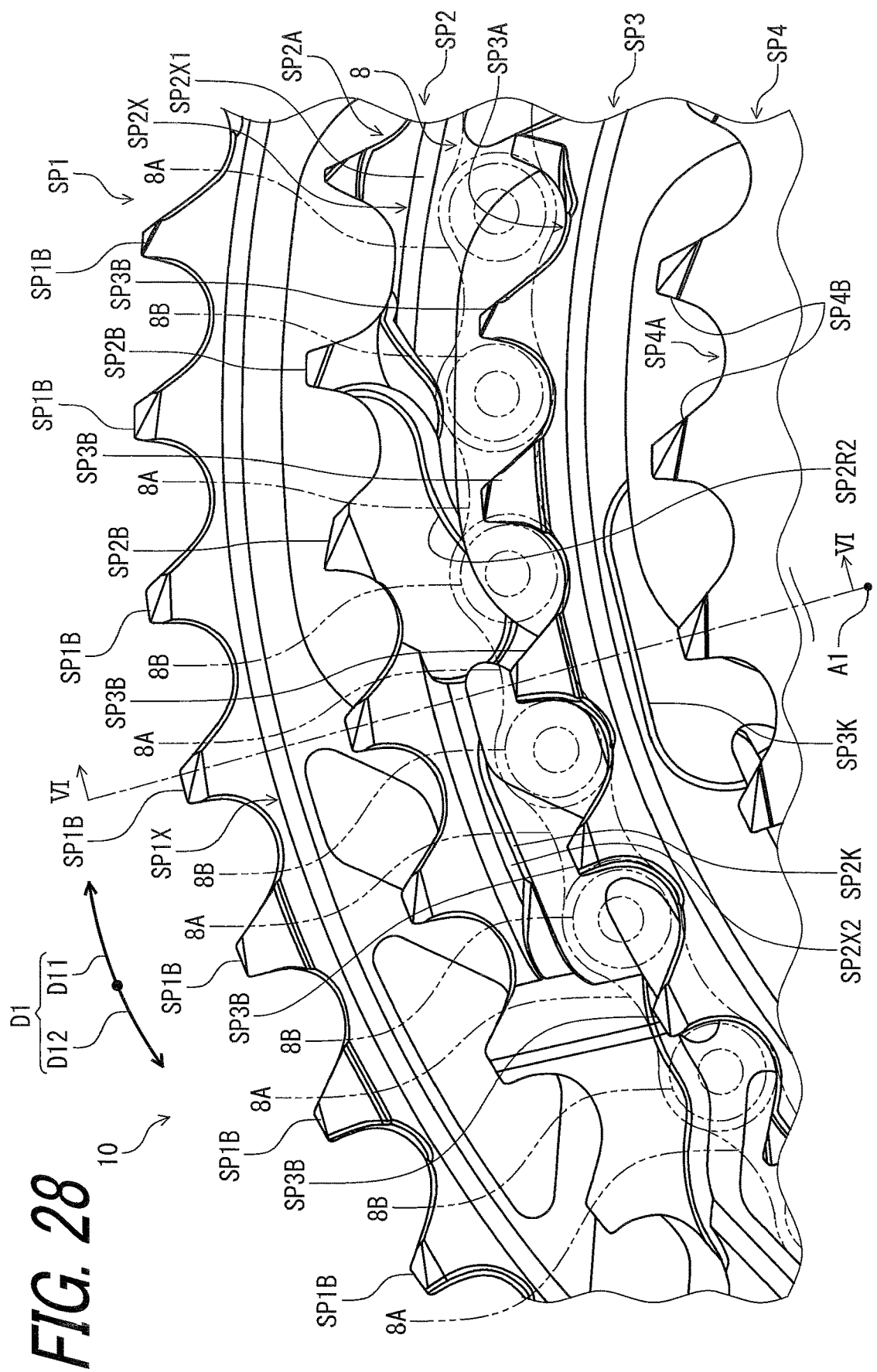
FIG. 28 is a partial side elevational view of the bicycle rear sprocket assembly illustrated in FIG. 1, with the bicycle chain.

As seen in FIG. 28, the axially outward protuberance SP2X is disposed on the outward facing side SP2G of the sprocket body SP2A to overlap at least partly with the bicycle chain 8 engaging with the neighboring bicycle sprocket SP3 when viewed along the rotational center axis A1. For example, the axially outward protuberance SP2X overlap at least partly with the link plate 8A coupled to the roller 8B engaged with the sprocket tooth SP3B of the neighboring bicycle sprocket SP3.

In this embodiment, the axially outward protuberance SP2X is disposed on the outward facing side SP2G of the sprocket body SP2A to overlap partly with the bicycle chain 8 engaging with the neighboring bicycle sprocket SP3 when viewed along the rotational center axis A1. However, the axially outward protuberance SP2X can be disposed on the outward facing side SP2G of the sprocket body SP2A to overlap entirely with the bicycle chain 8 engaging with the neighboring bicycle sprocket SP3 when viewed along the rotational center axis A1.

As seen in FIG. 6, the neighboring bicycle sprocket SP3 is adjacent to the bicycle sprocket SP2 without another sprocket between the bicycle sprocket SP2 and the neighboring bicycle sprocket SP3 in the axial direction D2. The neighboring bicycle sprocket SP3 can also be referred to as a neighboring smaller bicycle sprocket SP3. The neighboring smaller bicycle sprocket SP3 is adjacent to the outward facing side SP2G of the bicycle sprocket SP2 without another sprocket between the bicycle sprocket SP2 and the neighboring bicycle sprocket SP3 in the axial direction D2.

As seen in FIGS. 25 and 26, at least one of the axially outward protuberance SP2X and the axially inward protuberance SP2Y is provided radially inwardly of a root circle RC2 of the bicycle sprocket SP2. In this embodiment, as seen in FIG. 25, the axially outward protuberance SP2X is provided radially inwardly of the root circle RC2 of the bicycle sprocket SP2. However, the axially outward protuberance SP2X can be at least partly provided radially outwardly of the root circle RC2 of the bicycle sprocket SP2.

As seen in FIG. 25, the axially outward protuberance SP2X is provided radially between the root circle RC2 of the bicycle sprocket SP2 and a neighboring smaller root circle RC3 of the neighboring smaller bicycle sprocket SP3 when viewed along the rotational center axis A1. The axially outward protuberance SP2X is at least partly provided radially outwardly of a reference circle FC2 which is defined radially inwardly from the root circle RC2 of the bicycle sprocket SP2 by 10 mm. The axially outward protuberance SP2X is partly provided radially outwardly of a reference circle FC2. However, the axially outward protuberance SP2X can be at least partly provided outside an area defined radially between the root circle RC2 and the neighboring smaller root circle RC3 when viewed along the rotational center axis A1. The axially outward protuberance SP2X can be entirely provided radially outwardly of the reference circle FC2.

As seen in FIG. 6, a radially outer edge of the axially inward protuberance SP2Y is provided at a radial position which is substantially the same as a radial position of a radially outer edge of the axially outward protuberance SP2X. As seen in FIGS. 8 and 22, the axially inward protuberance SP2Y is disposed on the inward facing side SP2H of the sprocket body SP2A to overlap at least partly with the axially outward protuberance SP2X when viewed along the rotational center axis A1. The axially inward protuberance SP2Y is disposed on the inward facing side SP2H of the sprocket body SP2A to overlap partly with the axially outward protuberance SP2X when viewed along the rotational center axis A1. However, the axially inward protuberance SP2Y is disposed on the inward facing side SP2H of the sprocket body SP2A to overlap entirely with the axially outward protuberance SP2X when viewed along the rotational center axis A1.

Figure 29:
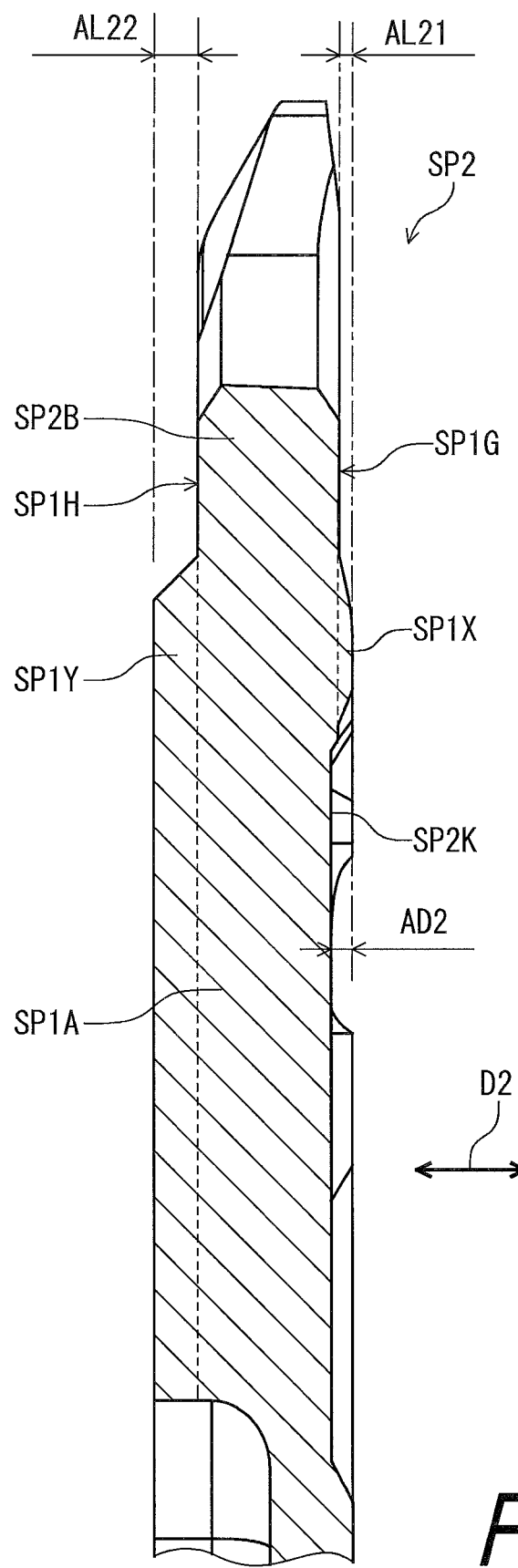
FIG. 29 is a cross-sectional view of the bicycle sprocket taken along line XXIX-XXIX of FIG. 8.

As seen in FIG. 29, the axially outward protuberance SP2X has a first axial length AL21 defined from the sprocket body SP2A in the axial direction D2. The axially inward protuberance SP2Y has a second axial length AL22 defined from the sprocket body SP2A in the axial direction D2. The first axial length AL21 is different from the second axial length AL22. In this embodiment, the first axial length AL21 is smaller than the second axial length AL22. However, the first axial length AL21 can be equal to or larger than the second axial length AL22. For example, the first axial length AL21 is larger than 0.1 mm and smaller than 0.5 mm. The second axial length AL22 is larger than 0.3 mm and smaller than 1 mm. The first axial length AL21 is 0.2 mm. The second axial length AL22 is 0.6 mm. However, the first axial length AL21 is not limited to this embodiment and the above range. The second axial length AL22 is not limited to this embodiment and the above range.

As seen in FIG. 8, the axially outward protuberance SP2X includes a recess SP2K to reduce interference between the bicycle chain 8 and the axially outward protuberance SP2X in a shifting operation in which the bicycle chain 8 is shifted from the neighboring bicycle sprocket SP3 to an additional neighboring bicycle sprocket SP4. As seen in FIG. 6, the additional neighboring bicycle sprocket SP4 is adjacent to the neighboring bicycle sprocket SP3 without another sprocket between the neighboring bicycle sprocket SP3 and the additional neighboring bicycle sprocket SP4 in the axial direction D2. In this embodiment, as seen in FIG. 8, the axially outward protuberance SP2X includes a plurality of recesses SP2K to reduce interference between the bicycle chain 8 and the axially outward protuberance SP2X in the shifting operation. However, a total number of the recesses SP2K is not limited to this embodiment.

As seen in FIG. 29, the recess SP2K has an axial depth AD2 defined in the axial direction D2. The axial depth AD2 is equal to or larger than the first axial length AL21. In this embodiment, the axial depth AD2 is larger the first axial length AL21. However, the axial depth AD2 can be equal to or smaller than the first axial length AL21.

Figure 30:
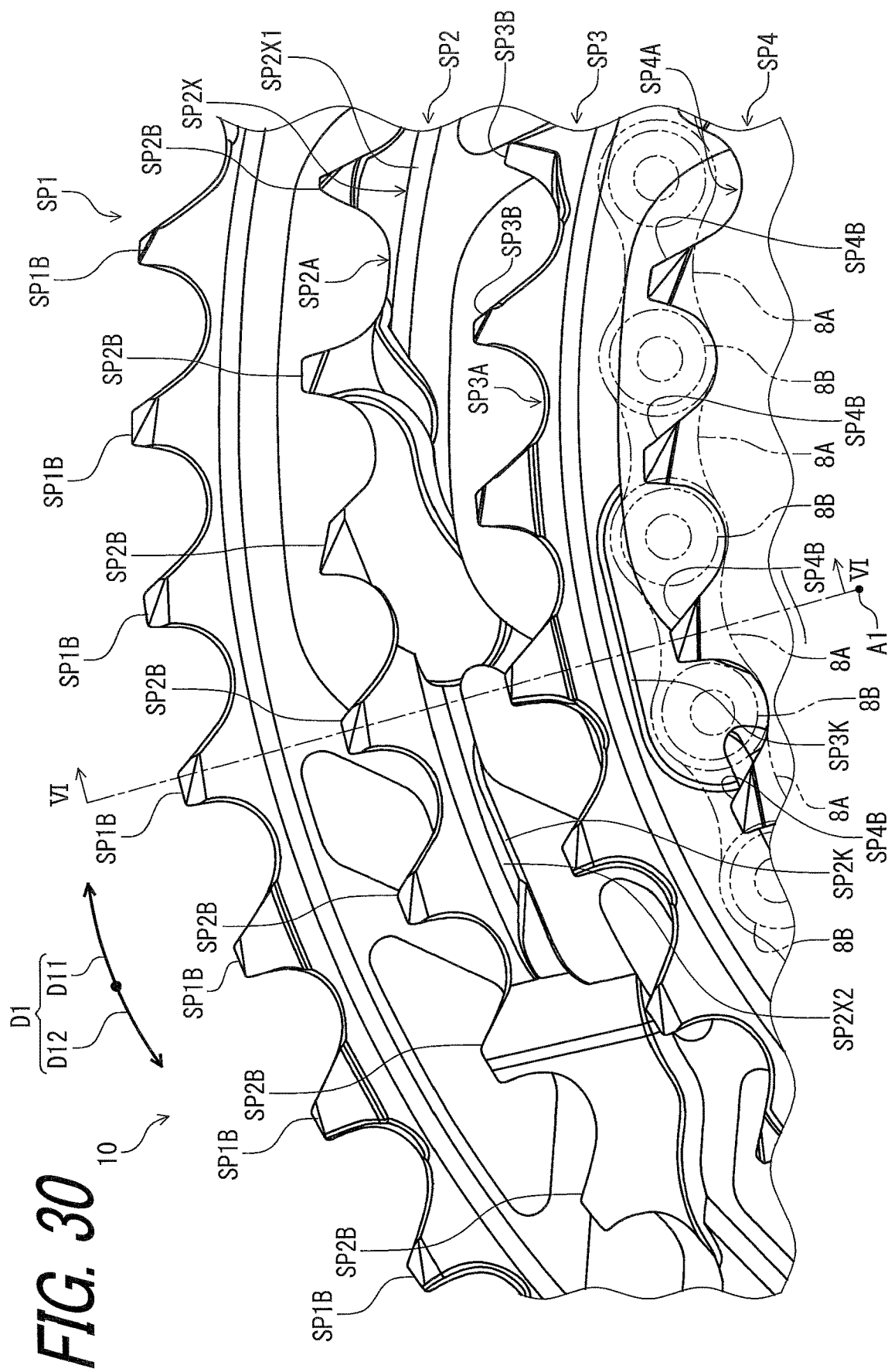
FIG. 30 is a partial side elevational view of the bicycle rear sprocket assembly illustrated in FIG. 1, with the bicycle chain.

As seen in FIG. 30, the axially outward protuberance SP3X is disposed on the outward facing side SP3G of the sprocket body SP3A to overlap at least partly with the bicycle chain 8 engaging with the neighboring bicycle sprocket SP4 when viewed along the rotational center axis A1. For example, the axially outward protuberance SP3X overlap at least partly with the link plate 8A coupled to the roller 8B engaged with the sprocket tooth SP4B of the neighboring bicycle sprocket SP4.

In this embodiment, the axially outward protuberance SP3X is disposed on the outward facing side SP3G of the sprocket body SP3A to overlap partly with the bicycle chain 8 engaging with the neighboring bicycle sprocket SP4 when viewed along the rotational center axis A1. However, the axially outward protuberance SP3X can be disposed on the outward facing side SP3G of the sprocket body SP3A to overlap entirely with the bicycle chain 8 engaging with the neighboring bicycle sprocket SP4 when viewed along the rotational center axis A1.

As seen in FIG. 6, the neighboring bicycle sprocket SP4 is adjacent to the bicycle sprocket SP3 without another sprocket between the bicycle sprocket SP3 and the neighboring bicycle sprocket SP4 in the axial direction D2. The neighboring bicycle sprocket SP4 can also be referred to as a neighboring smaller bicycle sprocket SP4. The neighboring smaller bicycle sprocket SP4 is adjacent to the outward facing side SP3G of the bicycle sprocket SP3 without another sprocket between the bicycle sprocket SP3 and the neighboring bicycle sprocket SP4 in the axial direction D2.

As seen in FIGS. 25 and 26, at least one of the axially outward protuberance SP3X and the axially inward protuberance SP3Y is provided radially inwardly of a root circle RC3 of the bicycle sprocket SP3. In this embodiment, as seen in FIG. 25, the axially outward protuberance SP3X is provided radially inwardly of the root circle RC3 of the bicycle sprocket SP3. However, the axially outward protuberance SP3X can be at least partly provided radially outwardly of the root circle RC3 of the bicycle sprocket SP3.

As seen in FIG. 25, the axially outward protuberance SP3X is provided radially between the root circle RC3 of the bicycle sprocket SP3 and a neighboring smaller root circle RC4 of the neighboring smaller bicycle sprocket SP4 when viewed along the rotational center axis A1. The axially outward protuberance SP3X is at least partly provided radially outwardly of a reference circle FC2 which is defined radially inwardly from the root circle RC3 of the bicycle sprocket SP3 by 10 mm. The axially outward protuberance SP3X is partly provided radially outwardly of a reference circle FC2. However, the axially outward protuberance SP3X can be at least partly provided outside an area defined radially between the root circle RC3 and the neighboring smaller root circle RC4 when viewed along the rotational center axis A1. The axially outward protuberance SP3X can be entirely provided radially outwardly of the reference circle FC2.

As seen in FIG. 6, a radially outer edge of the axially inward protuberance SP3Y is provided at a radial position which is substantially the same as a radial position of a radially outer edge of the axially outward protuberance SP3X. As seen in FIGS. 9 and 23, the axially inward protuberance SP3Y is disposed on the inward facing side SP3H of the sprocket body SP3A to overlap at least partly with the axially outward protuberance SP3X when viewed along the rotational center axis A1. The axially inward protuberance SP3Y is disposed on the inward facing side SP3H of the sprocket body SP3A to overlap partly with the axially outward protuberance SP3X when viewed along the rotational center axis A1. However, the axially inward protuberance SP3Y is disposed on the inward facing side SP3H of the sprocket body SP3A to overlap entirely with the axially outward protuberance SP3X when viewed along the rotational center axis A1.

Figure 31:
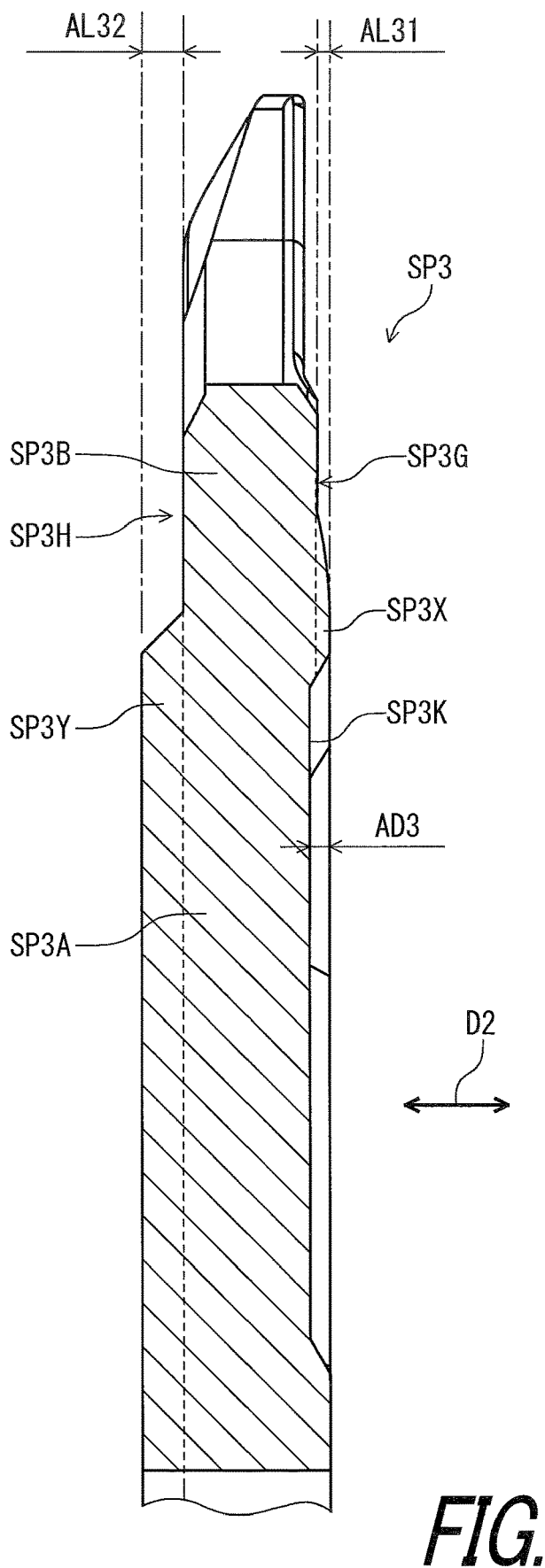
FIG. 31 is a cross-sectional view of the bicycle sprocket taken along line XXXI-XXXI of FIG. 9.

As seen in FIG. 31, the axially outward protuberance SP3X has a first axial length AL31 defined from the sprocket body SP3A in the axial direction D2. The axially inward protuberance SP3Y has a second axial length AL32 defined from the sprocket body SP3A in the axial direction D2. The first axial length AL31 is different from the second axial length AL32. In this embodiment, the first axial length AL31 is smaller than the second axial length AL32. However, the first axial length AL31 can be equal to or larger than the second axial length AL32. For example, the first axial length AL31 is larger than 0.1 mm and smaller than 0.5 mm. The second axial length AL32 is larger than 0.3 mm and smaller than 1 mm. The first axial length AL31 is 0.2 mm. The second axial length AL32 is 0.6 mm. However, the first axial length AL31 is not limited to this embodiment and the above range. The second axial length AL32 is not limited to this embodiment and the above range.

As seen in FIG. 9, the axially outward protuberance SP3X includes a recess SP3K to reduce interference between the bicycle chain 8 and the axially outward protuberance SP3X in a shifting operation in which the bicycle chain 8 is shifted from the neighboring bicycle sprocket SP4 to an additional neighboring bicycle sprocket SP5. As seen in FIG. 5, the additional neighboring bicycle sprocket SP5 is adjacent to the neighboring bicycle sprocket SP4 without another sprocket between the neighboring bicycle sprocket SP4 and the additional neighboring bicycle sprocket SP5 in the axial direction D2. In this embodiment, as seen in FIG. 9, the axially outward protuberance SP3X includes a plurality of recesses SP3K to reduce interference between the bicycle chain 8 and the axially outward protuberance SP3X in the shifting operation. However, a total number of the recesses SP3K is not limited to this embodiment.

As seen in FIG. 31, the recess SP3K has an axial depth AD3 defined in the axial direction D2. The axial depth AD3 is equal to or larger than the first axial length AL31. In this embodiment, the axial depth AD3 is larger the first axial length AL31. However, the axial depth AD3 can be equal to or smaller than the first axial length AL31.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket having a rotational center axis, an outward facing side facing in an axial direction parallel to the rotational center axis, and an inward facing side facing in the axial direction, the inward facing side being opposite to the outward facing side in the axial direction, the bicycle sprocket comprising:
    a sprocket body rotatable about the rotational center axis;
    a plurality of sprocket teeth extending radially outward from the sprocket body with respect to the rotational center axis;
    an axially outward protuberance disposed on the outward facing side of the sprocket body to overlap at least partly with a bicycle chain engaging with a neighboring bicycle sprocket when viewed along the rotational center axis, the neighboring bicycle sprocket being adjacent to the bicycle sprocket without another sprocket between the bicycle sprocket and the neighboring bicycle sprocket in the axial direction; and
    an axially inward protuberance disposed on the inward facing side of the sprocket body to overlap at least partly with the axially outward protuberance when viewed along the rotational center axis, wherein
    the axially outward protuberance includes a recess that at least partially extends radially inward of a radially outermost portion of the axially outward protuberance, and
    the sprocket body and the axially outward protuberance being continuously formed of a same material.

2. The bicycle sprocket according to claim 1, wherein the axially outward protuberance has a first axial length defined from the sprocket body in the axial direction, the axially inward protuberance has a second axial length defined from the sprocket body in the axial direction, and the first axial length is different from the second axial length.

3. The bicycle sprocket according to claim 2, wherein the first axial length is smaller than the second axial length.

4. The bicycle sprocket according to claim 2, wherein the first axial length is larger than 0.1 mm and smaller than 0.5 mm.

5. The bicycle sprocket according to claim 2, wherein the second axial length is larger than 0.3 mm and smaller than 1 mm.

6. The bicycle sprocket according to claim 1, wherein at least one of the axially outward protuberance and the axially inward protuberance is provided radially inwardly of a root circle of the bicycle sprocket.

7. The bicycle sprocket according to claim 1, wherein the recess is configured to reduce interference between the bicycle chain and the axially outward protuberance in a shifting operation in which the bicycle chain is shifted from a neighboring bicycle sprocket to an additional neighboring bicycle sprocket, the neighboring bicycle sprocket being adjacent to the bicycle sprocket without another sprocket between the bicycle sprocket and the neighboring bicycle sprocket in the axial direction, the additional neighboring bicycle sprocket being adjacent to the neighboring bicycle sprocket without another sprocket between the neighboring bicycle sprocket and the additional neighboring bicycle sprocket in the axial direction.

8. The bicycle sprocket according to claim 7, wherein the axially outward protuberance has a first axial length defined from the sprocket body in the axial direction, the recess has an axial depth defined in the axial direction, and the axial depth is equal to or larger than the first axial length.

9. The bicycle sprocket according to claim 1, further comprising
an axially inward recess provided on the outward facing side to facilitate an inward shifting operation in which the bicycle chain is shifted from a smaller sprocket to the bicycle sprocket.

10. The bicycle sprocket according to claim 1, further comprising
an axially outward recess provided on the outward facing side to facilitate an outward shifting operation in which the bicycle chain is shifted from the bicycle sprocket to a smaller sprocket.

11. The bicycle sprocket according to claim 1, wherein the bicycle sprocket is made of aluminum.

12. A bicycle sprocket having a rotational center axis, an outward facing side facing in an axial direction parallel to the rotational center axis, and an inward facing side facing in the axial direction, the inward facing side being opposite to the outward facing side in the axial direction, the bicycle sprocket comprising:
a sprocket body rotatable about the rotational center axis;
a plurality of sprocket teeth extending radially outward from the sprocket body with respect to the rotational center axis;
an axially outward protuberance disposed on the outward facing side of the sprocket body, the axially outward protuberance protruding from the sprocket body beyond the plurality of sprocket teeth in the axial direction, the axially outward protuberance being provided radially between a root circle of the bicycle sprocket and a neighboring smaller root circle of a neighboring smaller bicycle sprocket when viewed along the rotational center axis, the neighboring smaller bicycle sprocket being adjacent to the outward facing side of the bicycle sprocket without another sprocket between the bicycle sprocket and the neighboring bicycle sprocket in the axial direction; and
an axially inward protuberance disposed on the inward facing side of the sprocket body to overlap at least partly with the axially outward protuberance when viewed along the rotational center axis, wherein
the axially outward protuberance includes a recess that at least partially extends radially inward of a radially outermost portion of the axially outward protuberance, and
the sprocket body and the axially outward protuberance being continuously formed of a same material.

13. A bicycle sprocket having a rotational center axis, an outward facing side facing in an axial direction parallel to the rotational center axis, and an inward facing side facing in the axial direction, the inward facing side being opposite to the outward facing side in the axial direction, the bicycle sprocket comprising:
a sprocket body rotatable about the rotational center axis;
a plurality of sprocket teeth extending radially outward from the sprocket body with respect to the rotational center axis;
an axially outward protuberance disposed on the outward facing side of the sprocket body, the axially outward protuberance protruding from the sprocket body beyond the plurality of sprocket teeth in the axial direction, the axially outward protuberance being provided radially inwardly of a root circle of the bicycle sprocket, the axially outward protuberance being at least partly provided radially outwardly of a reference circle which is defined radially inwardly from the root circle of the bicycle sprocket by 10 mm; and
an axially inward protuberance disposed on the inward facing side of the sprocket body to overlap at least partly with the axially outward protuberance when viewed along the rotational center axis.

14. The bicycle sprocket according to claim 13, wherein the axially outward protuberance includes a recess that at least partially extends radially inward of a radially outermost portion of the axially outward protuberance.

* * * * *